Oct. 13, 1931.   H. HANSON   1,826,878
COMBINED TYPEWRITING AND COMPUTING MACHINE
Filed Feb. 23, 1923   14 Sheets-Sheet 10

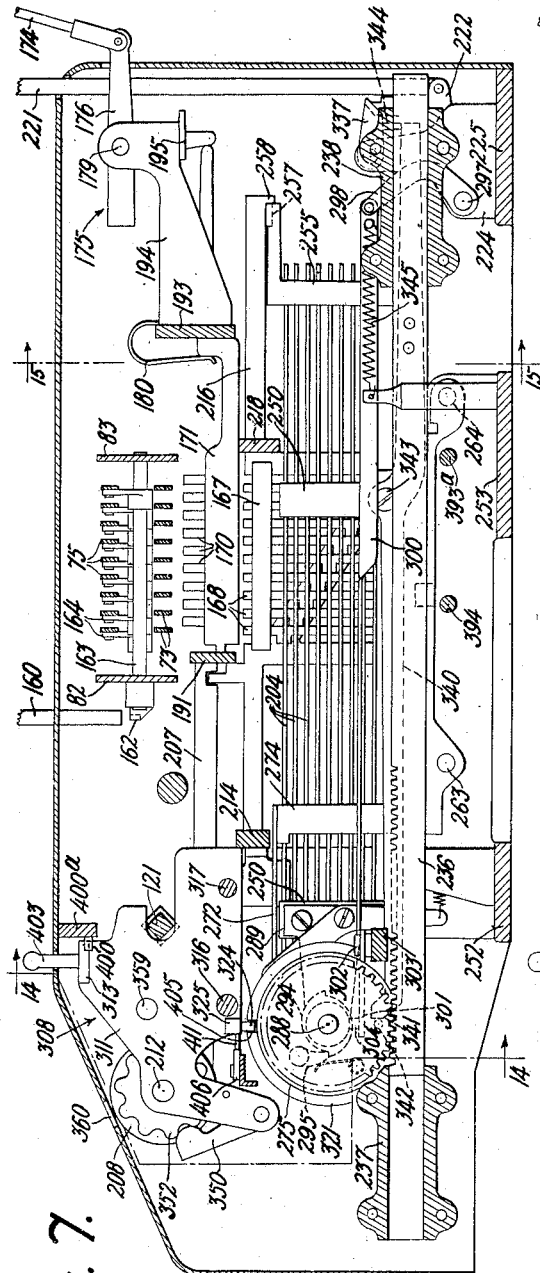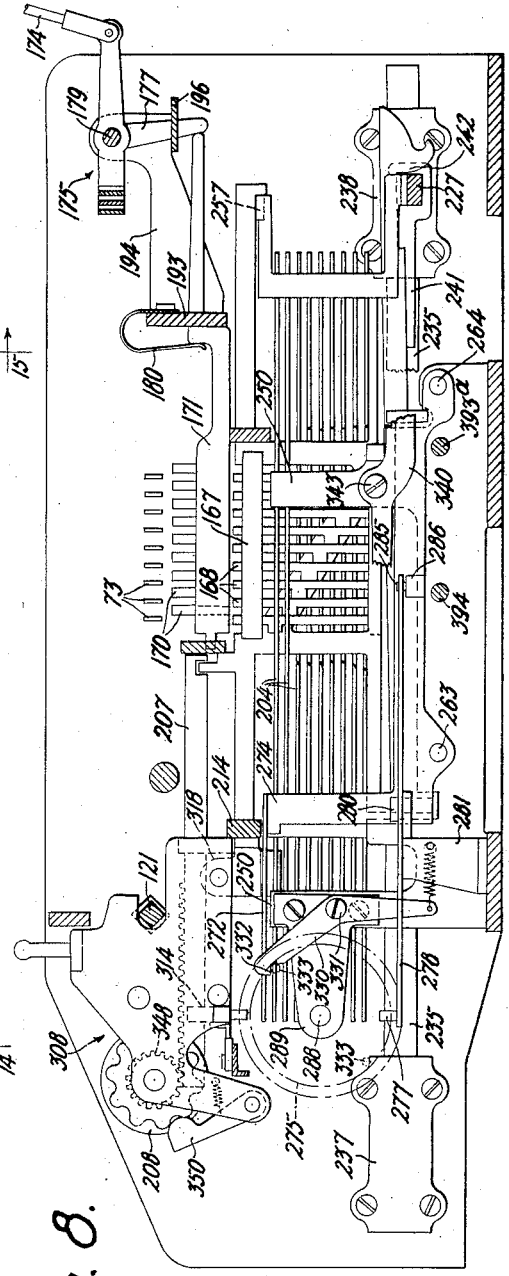

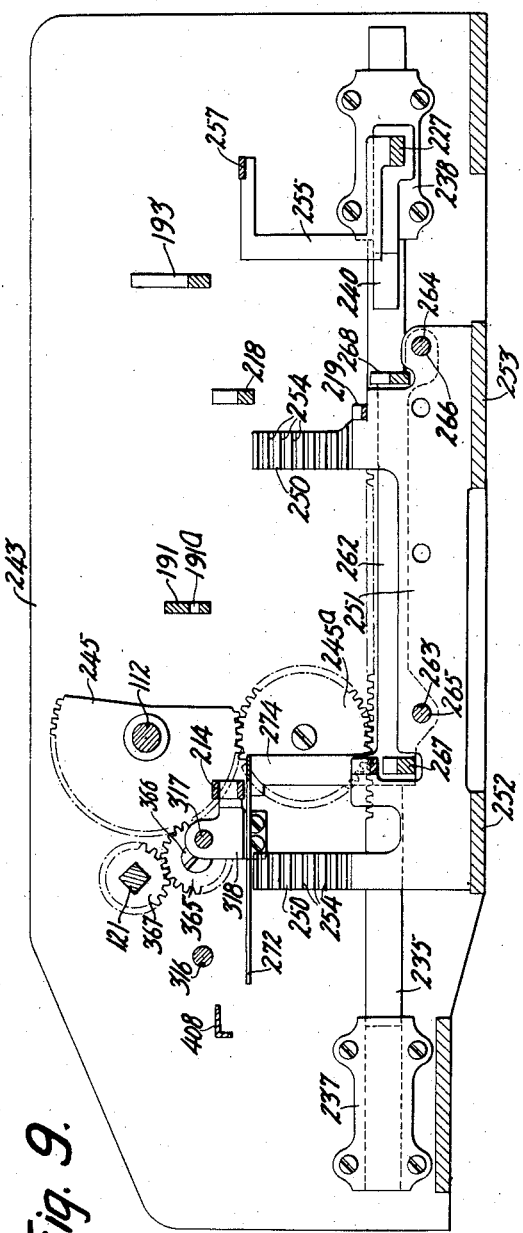
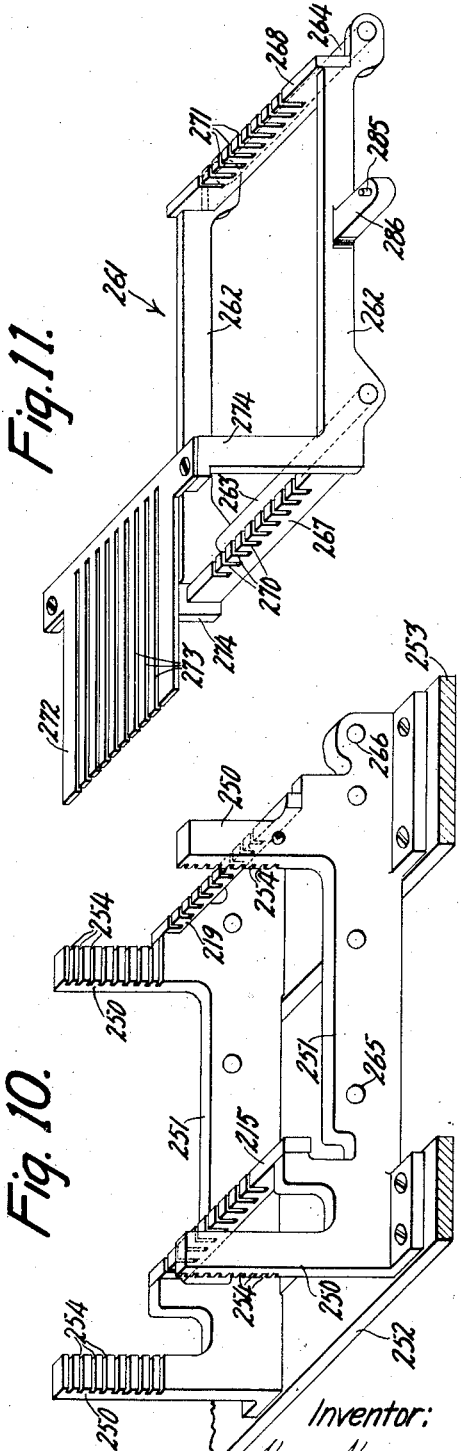

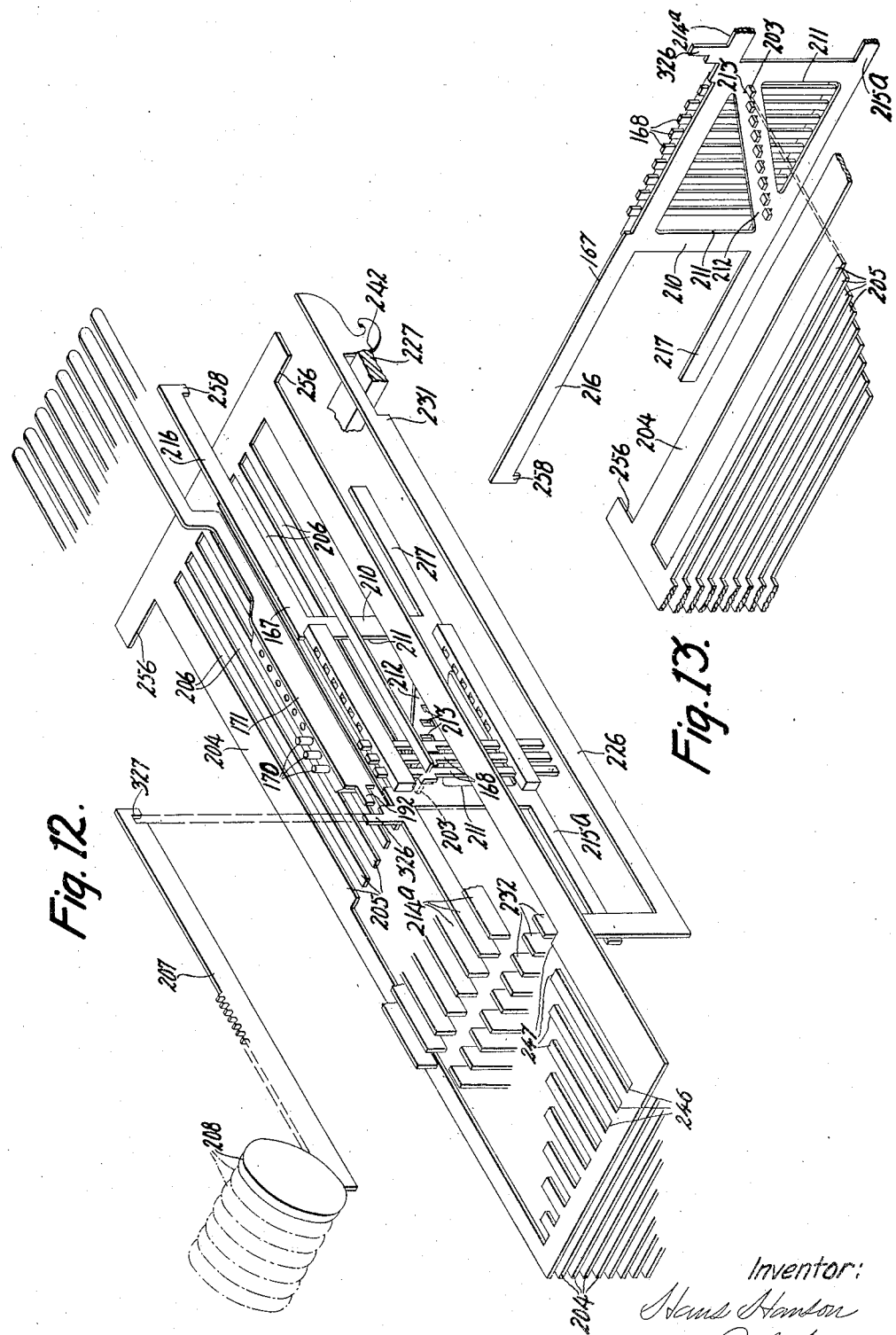

Inventor:
Hans Hanson
by B.C. Stickney
Attorney

Oct. 13, 1931. H. HANSON 1,826,878
COMBINED TYPEWRITING AND COMPUTING MACHINE
Filed Feb. 23, 1923 14 Sheets-Sheet 11

Inventor:
Hans Hanson
by B.C. Stickney
Attorney

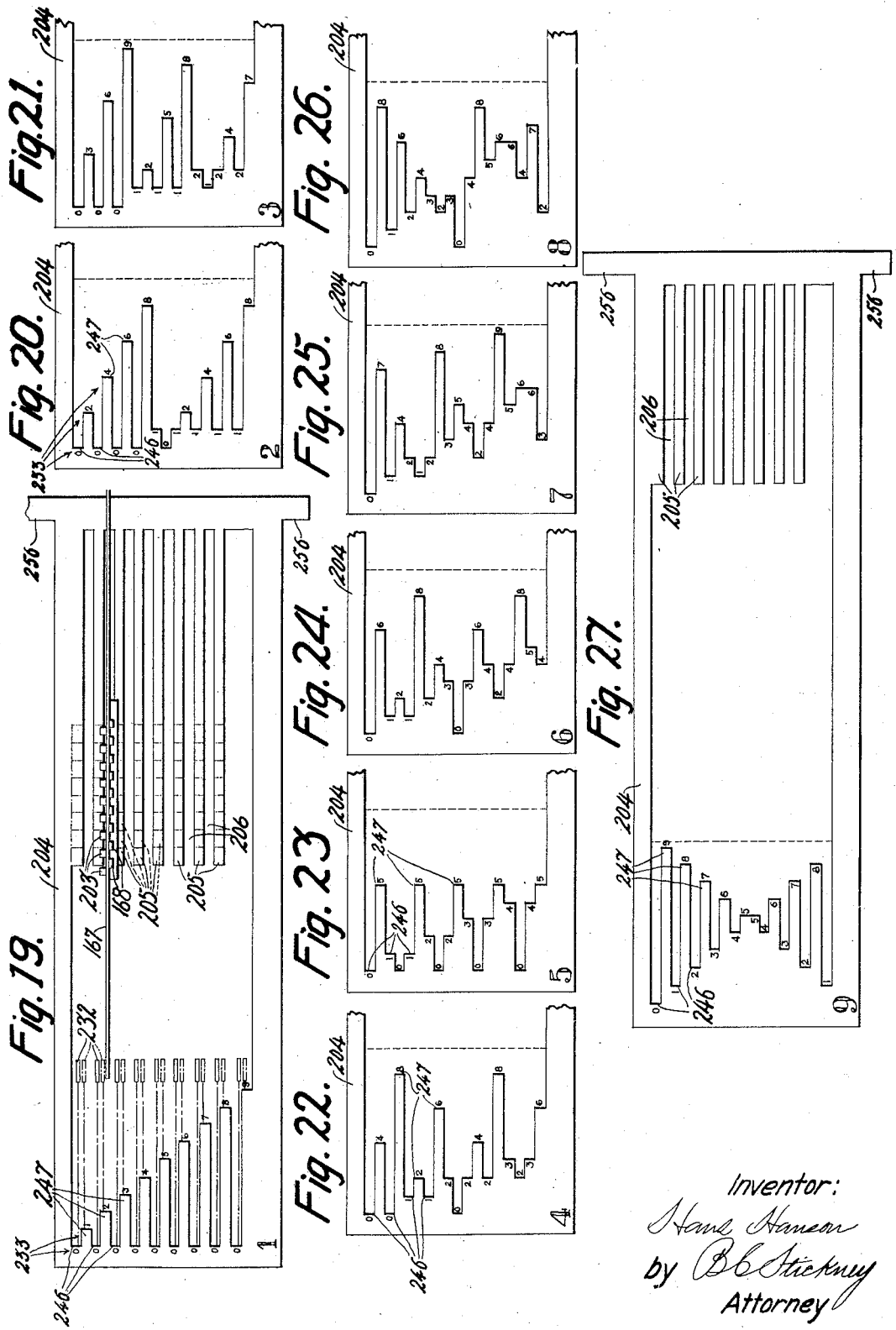

Oct. 13, 1931.   H. HANSON   1,826,878
COMBINED TYPEWRITING AND COMPUTING MACHINE
Filed Feb. 23, 1923   14 Sheets-Sheet 13

Inventor:
Hans Hanson
by B.C. Stickney
Attorney

Oct. 13, 1931. H. HANSON 1,826,878
COMBINED TYPEWRITING AND COMPUTING MACHINE
Filed Feb. 23, 1923 14 Sheets-Sheet 14
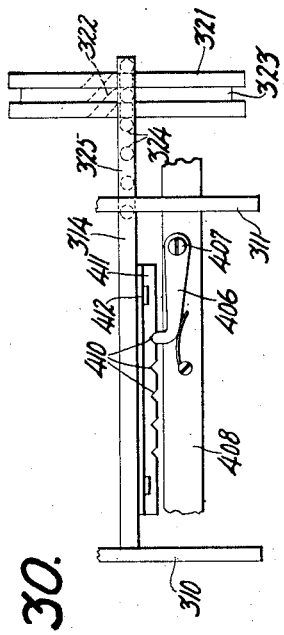
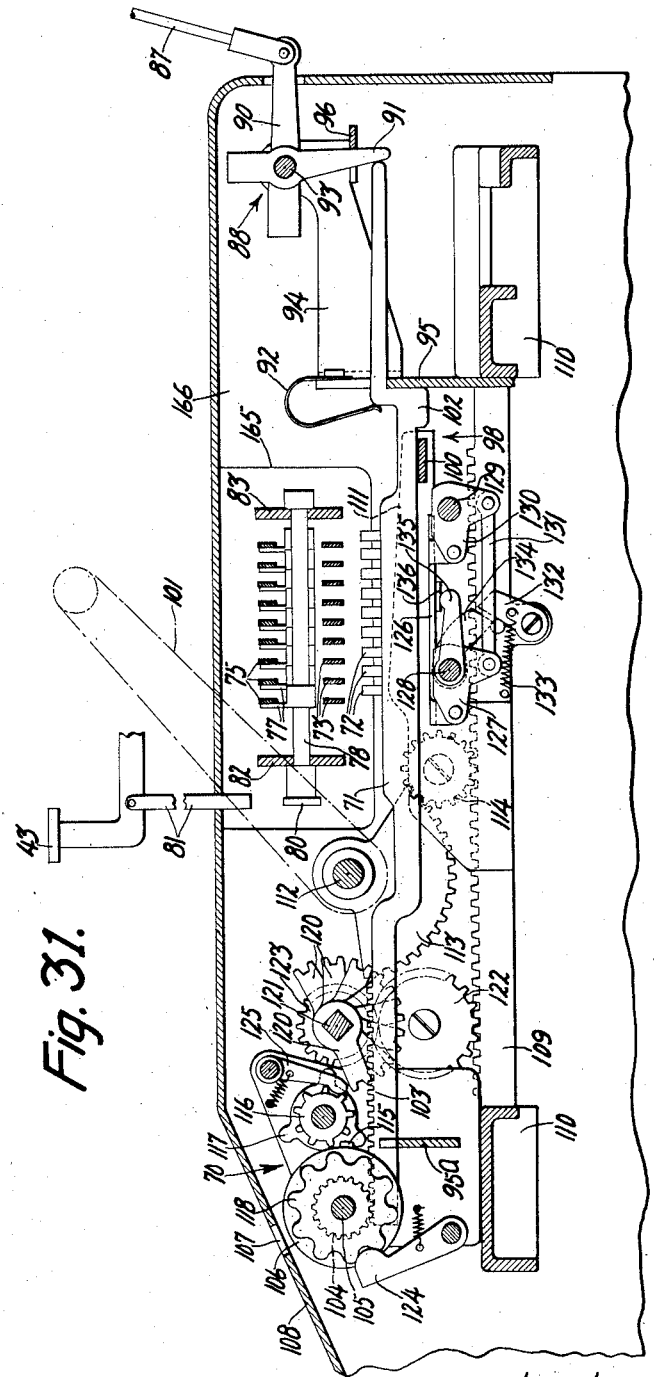

Patented Oct. 13, 1931

1,826,878

UNITED STATES PATENT OFFICE

HANS HANSON, OF IVORYTON, CONNECTICUT, ASSIGNOR, BY MESNE ASSIGNMENTS, TO ELLIOTT-FISHER COMPANY, OF NEW YORK, N. Y., A CORPORATION OF DELAWARE

COMBINED TYPEWRITING AND COMPUTING MACHINE

Application filed February 23, 1923. Serial No. 620,640.

This invention relates to multiplying mechanism, and certain features thereof relate to combined multiplying and typewriting mechanism. The improvements may be used in connection with features of the well-known Underwood bookkeeping machine, which comprises a typewriting section surmounting an adding section.

Some features in this invention provide that the multiplying section be compactly located at one side of the adding section in said Underwood machine, with keys to set up multiplicand indexing elements connected with dial-wheels of a product register, with other keys operative to set any one of a set of multiplier slides into effective driving relation with an actuating device or general operator; that product plates are provided to directly engage index pins set by the numeral-keys to drive the multiplicand slides; that denomination-selecting pin-bars are arranged under key-actuated pin-setting linkages, and provided with a series of interponents or transferring pins disposed above the indexing pins of each multiplicand slide; that the pin-selecting intermediate bars are actuated individually as the typewriter-carriage traverses the computing zone in letter-spacing; that when the multiplicand has been set up, the depressed indexing pins occupy positions in the paths of co-operating fingers of the product plates to be directly driven thereby; that the product plates serve to directly drive the index-pin bars to rotate the dial-wheels of the totalizer; that the pin-setting linkages of the Underwood bookkeeping machine that set up a number by means of the typewriter numeral-keys extend into the multiplying section so that the same linkages may be actuated by multiplicand keys for setting up the multiplicand or the multiplicand may be set up by the typewriter numeral-keys and that the adding and multiplying sections each have a general operator connected to a common driving shaft to run the numbers to be computed into the register.

Other features and advantages will hereinafter appear.

In the accompanying drawings,

Figure 7 is a view similar to Figure 6, the section being taken on the line 7—7 of Figure 4.

Figure 8 is a view similar to Figure 6, the section being taken on the line 8—8 of Figure 4.

Figure 9 is a view similar to Figure 6, but shows the various computing slides removed.

Figure 10 is a perspective view of the brackets which guide the product plates and the multiplicand devices.

Figure 11 is a perspective view of the reciprocatory carriage which supports the multiplier devices.

Figure 12 is a skeleton perspective view of the multiplicand devices, the multiplier devices and the product plates.

Figure 13 is a perspective view showing the engaging portions on the various product plates which co-operate with projections on the indexing elements of the multiplicand devices.

Figure 19 is a top plan view of the one product plate.

Figures 20 to 26, inclusive, are top plan views of the forward ends of the product plates, from two to eight, respectively.

Figure 27 is a top plan view of the nine product plate.

Figure 28:
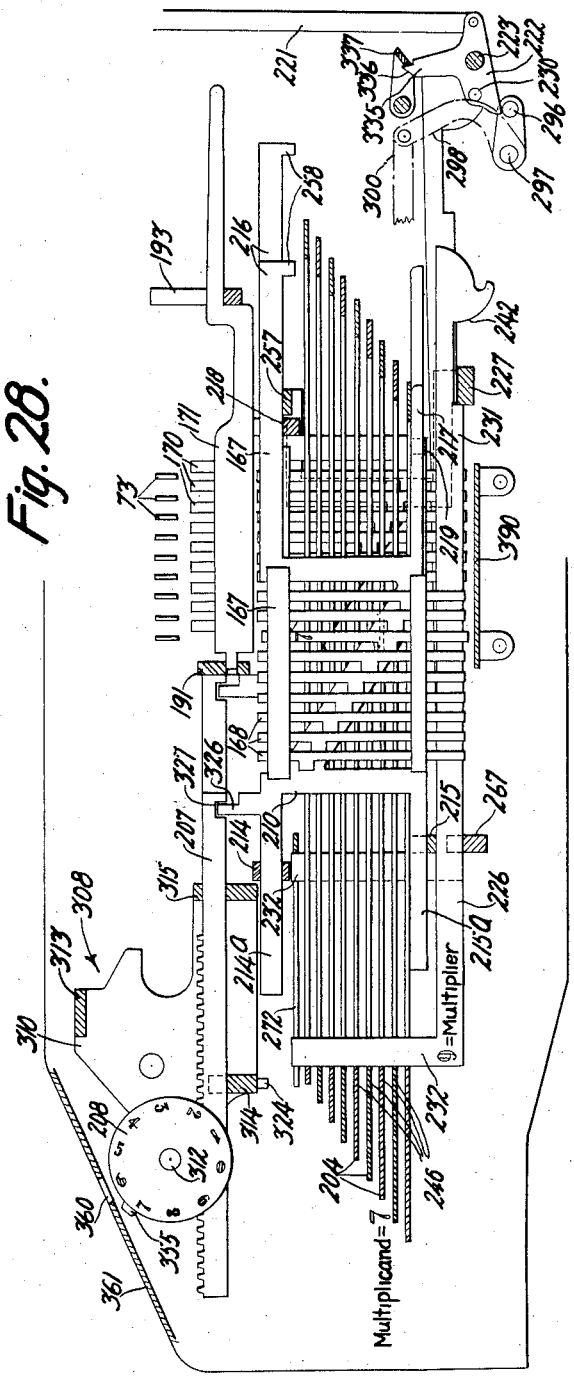

Figure 28 is a sectional side view, showing the position of the parts when the tens part of the product of seven times nine, or, in other words, the six of sixty-three, is being run in.

Figure 29:
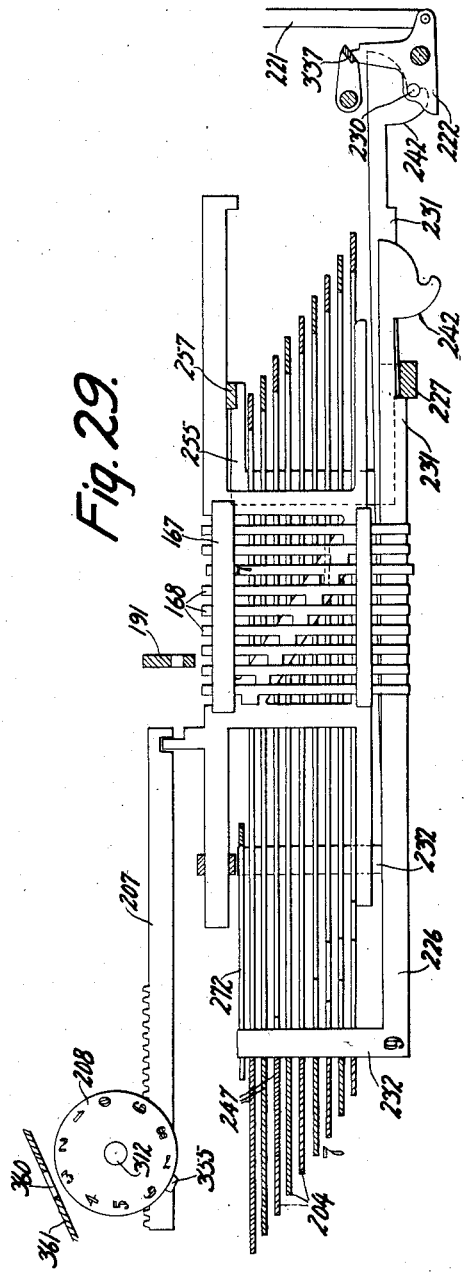

Figure 29 is a view similar to Figure 28, and shows the parts in position when the units part of the product of seven times nine, or, in other words, the three of the sixty-three, is being run in.

Figure 30 is a detail top plan view showing a portion of the register carriage, the register-feeding element and a detent for preventing accidental displacement of said carriage; the carriage being shown in its extreme left-hand position.

Figure 31 is a vertical section of the adding section of the machine.

Typewriter and addition section

The form of the machine herein described comprises a typewriter section 40, an addition section 41 disposed beneath the typewriter section, and a multiplication section 42 adjoining the addition section. The typewriter section 40 comprises numeral-keys 43 and alphabet-keys 44, which, when depressed, actuate key-levers 45 to rock bell cranks 46 about their fulcrum 47. The bell cranks 46 swing type-bars 48 to cause types 50 thereon to print against the front side of a revoluble platen 51, the platen being supported on a carriage 52. Said carriage travels on a front rail 53 and rear rail 54 supported on a main frame 55, and is fed at each actuation of a type-key, for letter-spacing, by mechanism comprising the usual universal frame 56, which is moved rearwardly by heels 57 on the type-bars during the latter part of the upward movement of the type-bars. The universal frame is supported at the rear by a guide-frame 58, comprising a rock-shaft 59 which serves as a pivot. A cross-bar 56ª on the universal frame 56 actuates a dog-rocker 60 provided with a loose dog 61 and a fixed dog 62 engaging with the usual escapement-wheel 63 to feed the carriage, the escapement-wheel having the usual one-way driving connection (not shown) with a pinion 64 meshing with a releasable rack 65 on the carriage. The carriage is drawn from right to left in the letter-feeding direction by the usual spring drum (not shown). The adding section 41, as previously stated, is located beneath the typewriter section, and a number, while it is being typed on the platen, may be set up in the adding section by the numeral-type-keys prior to running it into a register or totalizer 70.

The computing mechanism comprises a group of computing devices or bars 71 arranged in denominational order (Figures 4 and 31); each computing bar being provided with a set of indexing pins 72 having values from one to nine, inclusive. The pins of equal values of the various computing bars form rows extending transversely of the computing bars. Each transverse row of pins is normally disposed to the rear of a pin-setting bar 73, the pin-setting bars being operable by the numeral-keys 43 in a manner hereinafter described.

Figure 16:
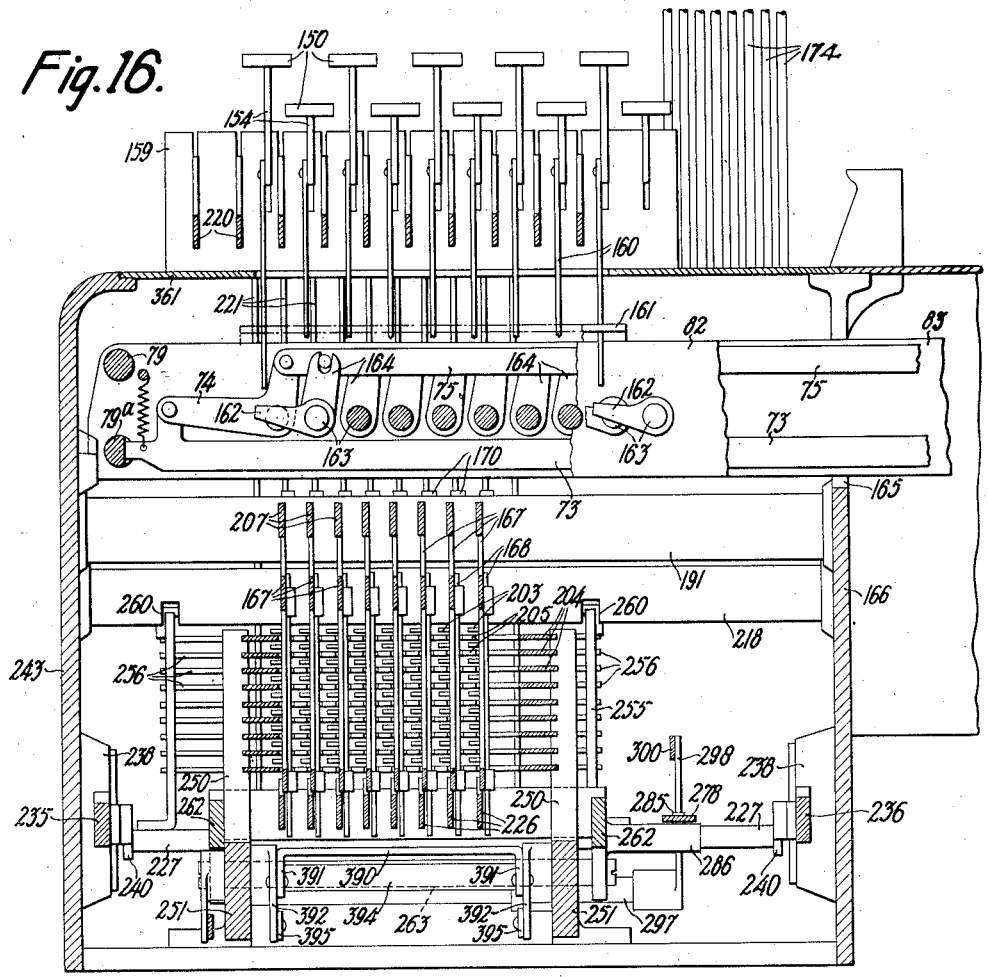
Figure 16 is a view similar to Figure 14, the section being taken on the line 16—16 of Figure 2.

To depress the indexing pins in order to set up the number, it is necessary to move the computing bars successively forward to carry the indexing pins 72 thereon into register with pin-setting bars 73, after which any one of the pins may be depressed by the actuation of its corresponding pin-setting bar; the setting of the indexing pins proceeding in descending denominational order of the various computing bars. Each pin-setting bar 73 is carried by bell-cranks 74, one at each end (Figures 1 and 31), to be moved downward thereby, said bell-cranks being connected to each other by a link 75. The links or bars 75 extend parallel with the pin-setting bars 73, but are movable lengthwise of themselves by arms 77 extending from rock-shafts 78. The rock-shafts 78 may be operated through the medium of arms 80, at their outer ends, engaged by plungers 81 extending from the numeral-keys 43. The rock-shafts are supported in a frame comprising front and rear plates 82 and 83 secured to each other by bars 79 and 79ª (Figure 16). It will be understood that the pin-setting bars may be normally operated by the numeral-type-keys without setting the indexing pins, each pin-setting bar being adapted to move idly downward in front of its associated row of said indexing pins. When the typewriter carriage enters a computing zone, the computing bars 71 are moved slightly forward to their pin-setting positions by means of denomination-selecting mechanism operable by the typewriter carriage to register the indexing pins with the pin-setting bars.

The denomination-selecting mechanism includes a selector 84 on the typewriter carriage, said selector being provided with a tappet 85, which is normally ineffective, but is, as the typewriter carriage enters the computing zone, raised with the selector by a cam-roller 89 to an effective position. The tappet is then effective to actuate jacks 86, one at a time, to depress their rear ends and move thrust-links 87 downwardly to operate transposition devices 88 (Figures 4 and 31), which may be like those disclosed in the patent to Pitman, No. 1,370,360, dated March 1, 1921. The transposition devices comprise nested bell-cranks having rearwardly-extending arms 90 connected with the lower ends of the thrust-rods 87, and downwardly-extending arms 91 co-operating with the rear ends of the computing bars 71 to push said computing bars forwardly to their pin-setting positions against the tension of return springs 92. The transposition devices are pivotally supported on a rod 93 supported by rearwardly-extending brackets 94 on a fixed plate 95. They are held in their positions, endwise of the rod, so as to properly engage the computing bars, by means of a slotted guide-plate 96 through which arms 91 extend. The computing bars are guided in their movements by the plate 95 at their rear ends and a fixed plate 95ᵃ at their forward ends. The set-up number is run into the register 70 by means of an actuator or general operator 98, comprising a cross-bar 100 to be driven forwardly by an actuating handle 101. The cross-bar, in its forward movement, engages the lower ends of the set or depressed indexing pins, to move the computing bars 71 forwardly varying distances corresponding with the values of the set indexing pins, and, on its return movement, engages shoulders 102 to restore the computing bars to normal. The forward ends of the computing bars are provided with racks 103, to mesh with pinions 104 supported on a shaft 105, the pinions having the usual one-way driving connections with dial-wheels 106 of the register. A sight-opening 107 is provided, in a cover-plate 108, through which the numerals on the dial-wheels may be observed. The general operator 98 comprises two rack-bars 109, one at each side of the addition section, said rack-bars being suitably guided at their front and rear ends in brackets 110. Each rack-bar is provided with a rearwardly-extending arm 111, said arms supporting the cross-bar 100.

The driving connection between the general operator and the operating handle comprises a rock-shaft 112 to which said handle is secured so that it may be rotated by said handle. The shaft has fastened thereon two gear sectors 113 to drive pinions 114, one at each side of the addition section, said pinions meshing with the rack-bars of the general operator to drive the latter forwardly and rearwardly by pulling the handle forward and pushing it backward, respectively. The carry-over mechanism comprises a carry-over-initiating tooth 115 on each dial-wheel to partially actuate or set an intermediate carry-over pinion 116 when the dial-wheel passes from "9" to "0" at the sight-opening 107. Each carry-over pinion has fixed thereto a three-tooth gear wheel 117 which is brought into co-operative relation with a ten-tooth gear wheel 118 fastened to the side of the dial-wheel 106 of the next higher denominational order. The carry-over-initiating teeth 115 in imparting a partial movement to the carry-over pinions set the pinions that they may be engaged at the proper time by carry-over-completing sectors or arms 120. The carry-over-completing arms, of which there is one for each carry-over pinion, are spirally arranged on a square shaft 121 so that they may be rotated by said shaft in a clockwise direction during the return stroke of the general operator. The connection between the general operator and the carry-over shaft 121 comprises a gear 122 to be driven by the left-hand rack-bar 109 of the general operator 98. Said gear 122 drives a pinion 123 having the usual one-way driving connection with the carry-over shaft 121 so that the shaft 121 is actuated only on the return stroke of the general operator. When said carry-over shaft is actuated, the carry-over-completing arms 120 engage, one at a time, with their corresponding carry-over pinions 116 to complete their actuation, thus rotating the dial-wheels of next higher order one digit distance through the medium of the three-tooth wheels 117 which co-operate with the ten-tooth gear wheels 118. Spring-pressed detents 124 and 125 are provided to hold the dial-wheels 106 and the carry-over pinions 116 respectively against accidental displacements. The usual detent (not shown) holds the carry-over shaft 121 against accidental rotation.

After a number is run into the register, the indexing pins 72 are restored to eliminate the set-up number from the computing bars. For this purpose there is provided a pin-restoring platform 126 disposed beneath the indexing pins and adapted to move upwardly to push said pins back to normal. Said platform is guided in these movements at its forward end by two bell-cranks 127 one at each side thereof, said bell-cranks being loosely mounted on a rock-shaft 128. Similar bell-cranks 130 are provided on a shaft 129 to carry the rear end of the platform; the bell-cranks 127 and 130 being connected to each other by links 131 to cause them and consequently the platform 126 to move in parallelism.

To actuate the pin-restoring platform 126 there is provided a pawl 132 on the left-hand rack-bar 109 of the general operator. This pawl during the forward movement of the general operator yields against the tension of a spring 133 and moves past a cam arm 134 secured to the rock-shaft 128. On the return stroke of the general operator the spring pawl 132 actuates the cam arm 134 to move the rock-shaft in a counter-clockwise direction. Said rock-shaft is provided with a finger 135 extending rearwardly therefrom, to engage an extension 136 of the pin-restoring platform 126 to move the latter upwardly, and consequently restores the indexing pins 72 to normal. Immediately prior to the completion of the return movement of the general operator the spring pawl 132 moves past the cam arm 134, thus allowing the latter, and consequently the pin-restoring platform 126, to drop back to normal position.

Figure 2:
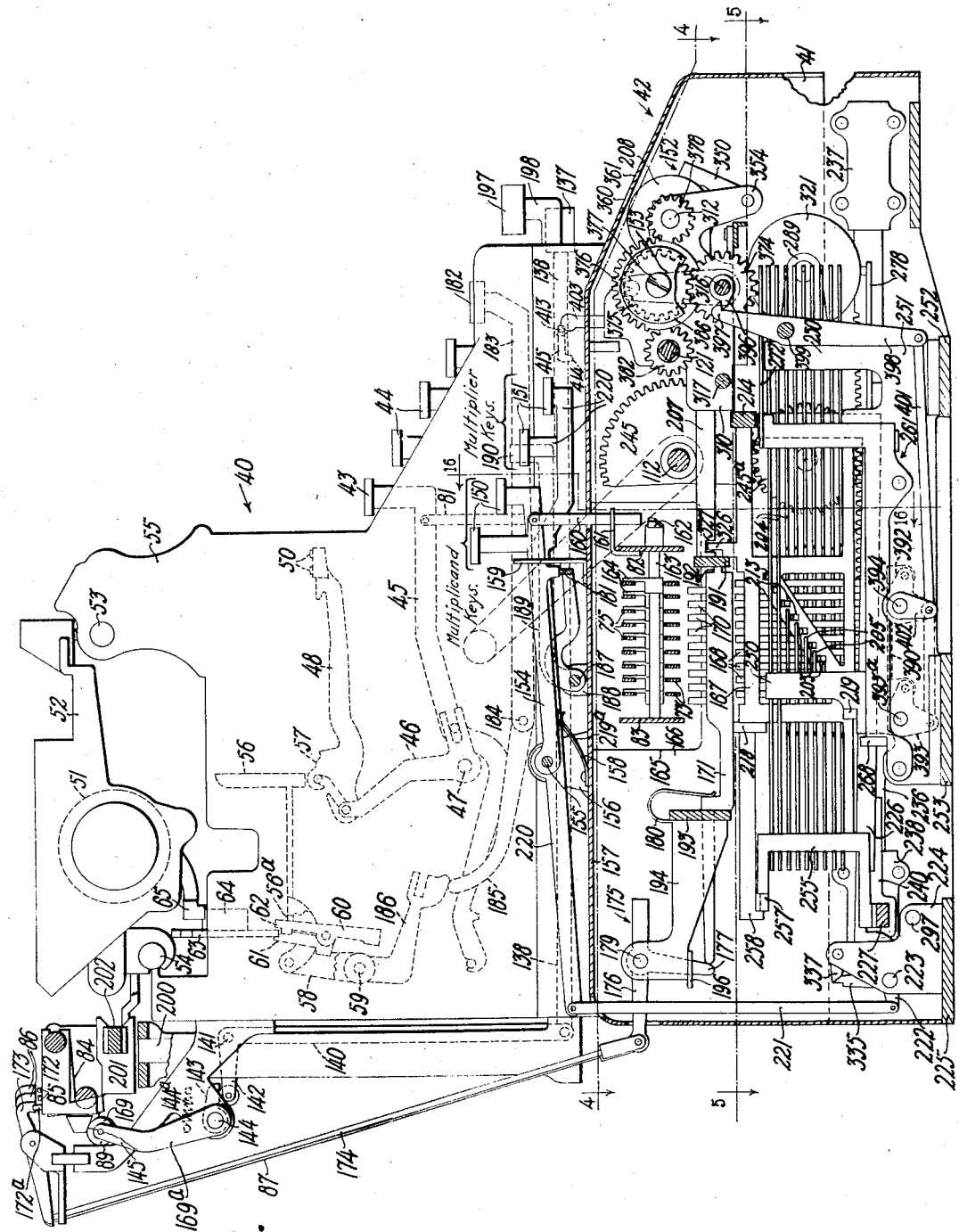
Figure 2 is a left-hand side view of the machine in section, the section being taken on the line 2—2 of Figure 1.

It will be understood that a plurality of adding registers may be used, two being shown herein, in which case each register is provided with a separate set of jacks 86 (Figure 2). The jacks of the various registers are of different lengths to be engaged by separate selectors 84, the tappets 85 of the various selectors being arranged to travel in separate paths into which the engaging portions of the various sets of jacks extend.

The computing mechanism may be rendered ineffective so as not to operate when the cariage traverses the computing zone. For this purpose there is provided a non-computing key 137, which when actuated moves a thrust-bar 138 rearwardly to rock a bell-crank lever 140 about its pivot 141. The arm 142 engages a projection 143 extending from a shaft 144 to rock the latter against the tension of a return spring 144ᵃ (Figure 2); said shaft having for each register a pair of upwardly-extending arms 145 (Figures 1 and 2) to support the cam roller 89 of the associated register. When the shaft 144 is rocked the arms 145 carry the cam rollers 89 out of effective relation with the selectors 84, and the selectors remain in their lower positions when the carriage passes through a computing zone. Consequently the jacks 86 are not operated and the computing bars 71 are not moved forward to their pin-setting positions, thus permitting a number to be typed without indexing it on said computing bars.

It will be understood that the typewriter section and the adding section are substantially like those of the Underwood bookkeeping machine, shown in my Patents Nos. 905,422 and 1,278,812, which machine is adapted to subtract as well as add. The computing section 41 is herein shown, for the sake of simplicity, to add only.

*Multiplication section (multiplicand keys and parts operated thereby)*

The multiplying mechanism will now be described. In general it comprises a group of multiplicand keys 150 (Figures 1, 2 and 3), by which the multiplicand may first be set up. A set of multiplier keys 151 may then be operated successively corresponding to the digits of the multiplier; but, after the actuation of each multiplier key, the actuating handle 101 is operated twice to run the tens and units partial products of each multiplier digit separately into a product register 152. The register may be cleared by means of a zero-setting handle 153, said handle being also effective to eliminate the set-up multiplicand from the machine, as hereinafter described.

The multiplicand keys 150 are carried on the forward ends of key-levers 154 which swing about a fulcrum rod 155 supported by brackets 156 secured to a top plate 157 of the multiplication section 42. Said keys when actuated move against return springs 158 and push thrust-rods 160 at their forward ends downwardly. The thrust-rods extend through a fixed plate 161 (Figures 2 and 16) to guide them into engagement with arms 162 secured to rock-shafts 163 to actuate the latter. The rock-shafts 163 have upwardly-extending arms 164 (see Figure 4 also) connected with the upper bars 75 of the pin-setting linkages to actuate said linkages to depress the pin-setting bars 73 in a manner previously described in connection with the numeral-type-keys 43. A guide-plate 159 is provided at the forward ends of said key-levers to hold them in position sidewise.

The pin-setting linkages extend over from the addition section 41 into the multiplication section 42 through an opening 165 in a wall or partition 166 separating said sections.

The multiplicand may be set up on a series of multiplicand devices comprising slides 167 (Figures 6, 13 and 28) arranged in denominational order, each slide having a set of indexing devices or pins 168 thereon, the pins of each set having values from one to nine, inclusive. The indexing pins may be set by the pin-setting bars 73, but, instead of engaging directly with the multiplicand indexing pins 168, they actuate interponents or intermediate pins 170 carried by denomination-selecting slides 171. Each set of intermediate pins 170 is associated with one of the sets of the indexing pins 168. The intermediate pins 170 of the various sets form rows extending transversely of the denomination-selecting slides, and each row being disposed to the rear of the associated pin-setting linkage.

*Denomination-selecting mechanism*

The denomination-selecting mechanism for the multiplying mechanism comprises a cam-roller 169 (Figures 1 and 2) supported on arms 169ᵃ secured to the rock-shaft 144. A multiplication denomination-selector 172 rides up on the cam-roller when the typewriter carriage enters the multiplication zone to cause a tappet 172ᵃ to engage a set of jacks 173 to actuate said jacks successively. The jacks operate thrust-bars 174 to actuate transposition devices 175. The transposition devices are in the form of nested bail-like bell-cranks fulcrumed on a rod 179 and having rearwardly-extending arms 176 connected with the thrust-bars 174, and downwardly-extending arms 177 engaging the denomination-selecting slides or pin-bars 171, to move them forwardly to bring the intermediate pins into register with the indexing pins 168 and the pin-setting bars 73. The selecting bars 171 are actuated one at a time, and while the carriage occupies a letter-space position in the multiplication zone the denomination-selecting bar corresponding to the denominational position of the carriage is held forward.

If a multiplicand key 150 is now operated, the pin-setting bar 73, connected therewith, moves the corresponding intermediate pin 170 to depress the associated indexing pin 168, or, in other words, set it to an effective position. The intermediate pins 170 are restored to normal by springs 178 (Figure 6) upon the return of the multiplicand keys. The indexing pins 168 are held in the positions to which they may be moved by a spring bar having individual detent springs 168ª. On the return stroke of the depressed multiplicand key, the carriage 52 is fed, in the manner presently to be described, to actuate the next jack to move the selecting bar 171 of next lower denominational order to its effective position, and permits the previously-operated selecting bar to be returned to normal by a spring 180. The next digit of the multiplicand may now be set. In this manner, as the carriage passes through a computing zone, the various digits of the multiplicand are set up.

The typewriter carriage is fed, for denomination-selecting, by the multiplicand keys through a universal bar 181 operable by said keys and connected to actuate the usual space-bar 182 of the typewriting machine. Said space-bar is supported by two forwardly-extending arms 183 (Figures 2 and 3) secured to a rock-shaft 184, said rock-shaft having a rearwardly-extending arm 185 to engage a downwardly-extending arm 186 secured to the rock-shaft 59 of the guide-frame 58 associated with the escapement-mechanism, so that the latter may be actuated by said space-bar to actuate the dog-rocker 60 through the medium of the universal frame 56. The universal bar 181, in the shape of a bail, is fixed to a shaft 187 which is pivotally supported on brackets 188 and extends inwardly beneath the typewriter section 40 where it is provided with a forwardly-extending arm 189 having a lip 190 to engage the left-hand supporting arm 183 of the space-bar to rock the shaft 184, and consequently actuate the escapement-mechanism, to feed the carriage as previously described. Thus the carriage moves to the next letter-space position to actuate the pin-bar 171 of next lower denominational order and permits the previously-operated pin-bar to be restored to normal.

Figure 3:
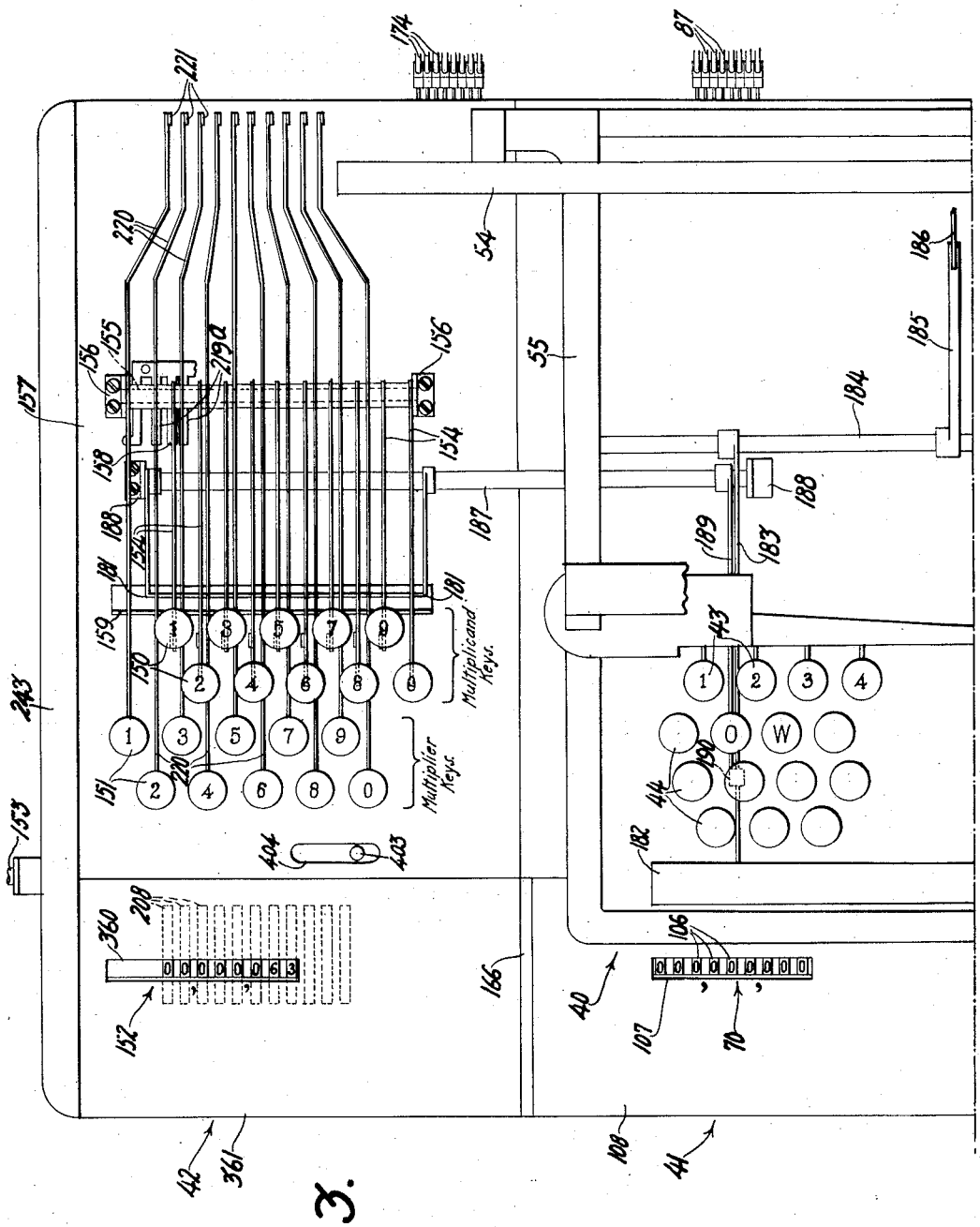
Figure 3 is a top plan view of the machine, with some of the parts omitted or broken away for clearness.

By inspection of Figure 3, it will be seen that there are ten multiplicand keys 150. It should be understood, however, that only the keys from "1" to "9", inclusive, are provided with thrust-rods 160 to set up the multiplicand on the said multiplicand devices 167; the "0" key of said group being effective only to actuate the universal bar 181 to feed the typewriter carriage in denomination order. For example, if the multiplicand should be 3062, the "3" key is first operated to set up the "3", and the carriage then moves to the next decimal position. The "0" key is then operated, no setting being accomplished by said "0" key, but the feeding of the carriage to the next decimal position is effected thereby. The "6" key and the "2" key may then be operated to set the remainder of the multiplicand.

Since both sets of key-operated rock-shafts 78 and 163 are connected to the pin-setting linkages, including the setting bars 73, it will be understood that the numeral-type-keys 43 may also be used to set up the multiplicand and thus the multiplicand may, if desired, be typed on the work-sheet.

The denomination-selecting pin-bars 171 are supported and guided at their forward ends by a fixed cross-bar 191 (Figure 6); said selecting bars having reduced forward ends 192 engaging in slots 191ª of the guide-bar 191. Another fixed cross-bar 193 provided with slots through which the selecting bars extend, guides the rear ends of said bars; the return springs 180 for the selecting bars being carried by said last-named cross-bar.

Brackets 194 are secured to the cross-bar or guide-plate 193 and extend rearwardly therefrom to support the fulcrum rod 179 of the transposition devices. To hold the transposition devices endwise on their fulcrum rod and also keep them in co-operative relation with the denomination-selecting pin-bars 171, the downwardly-extending arms 177 of said transposition devices engage in slots 195 in a guide-plate 196 secured to the under side of the rearwardly-extending brackets or arms 194.

Figure 1:
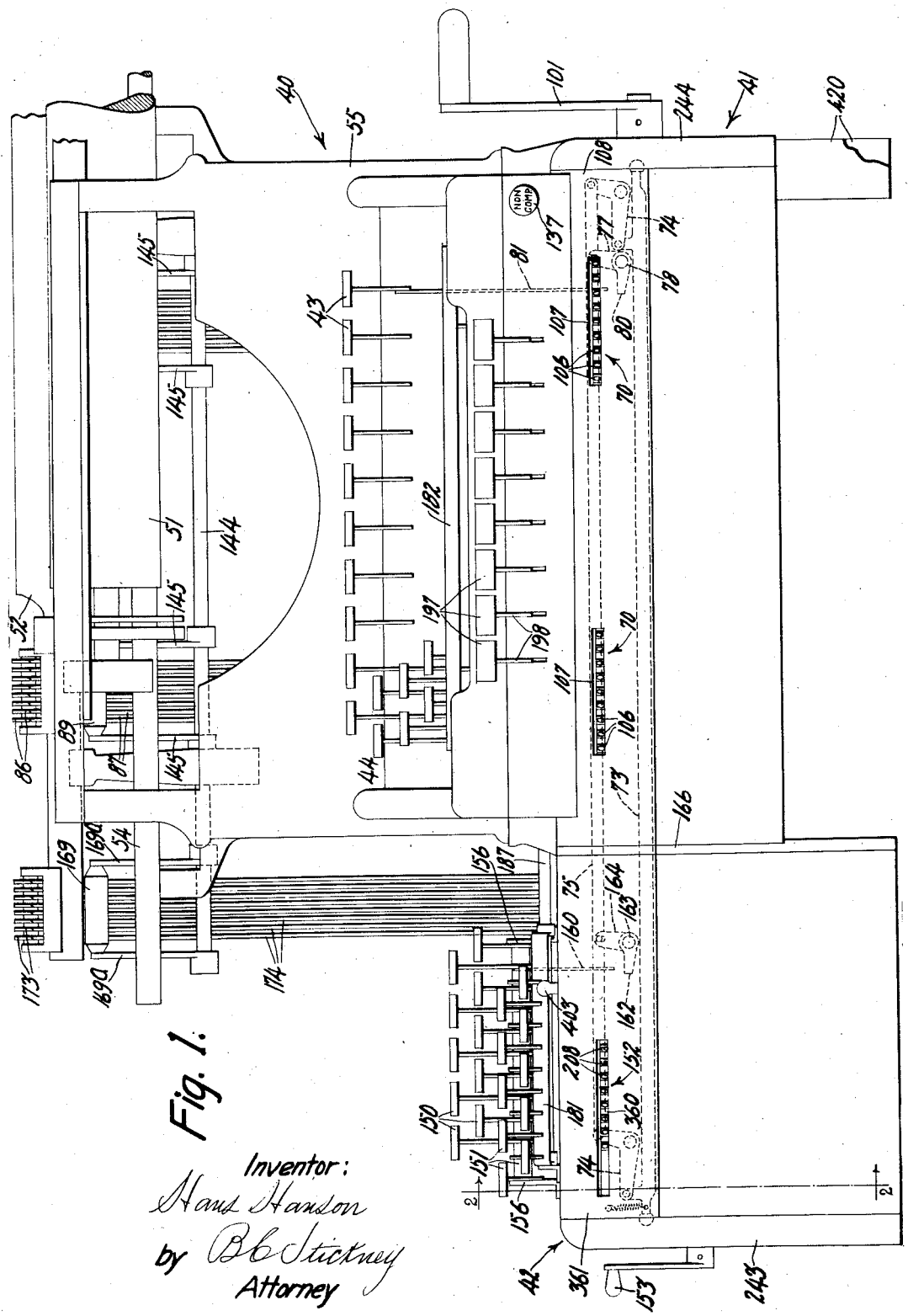
Figure 1 is a partial front elevation of the machine.
Figure 4:
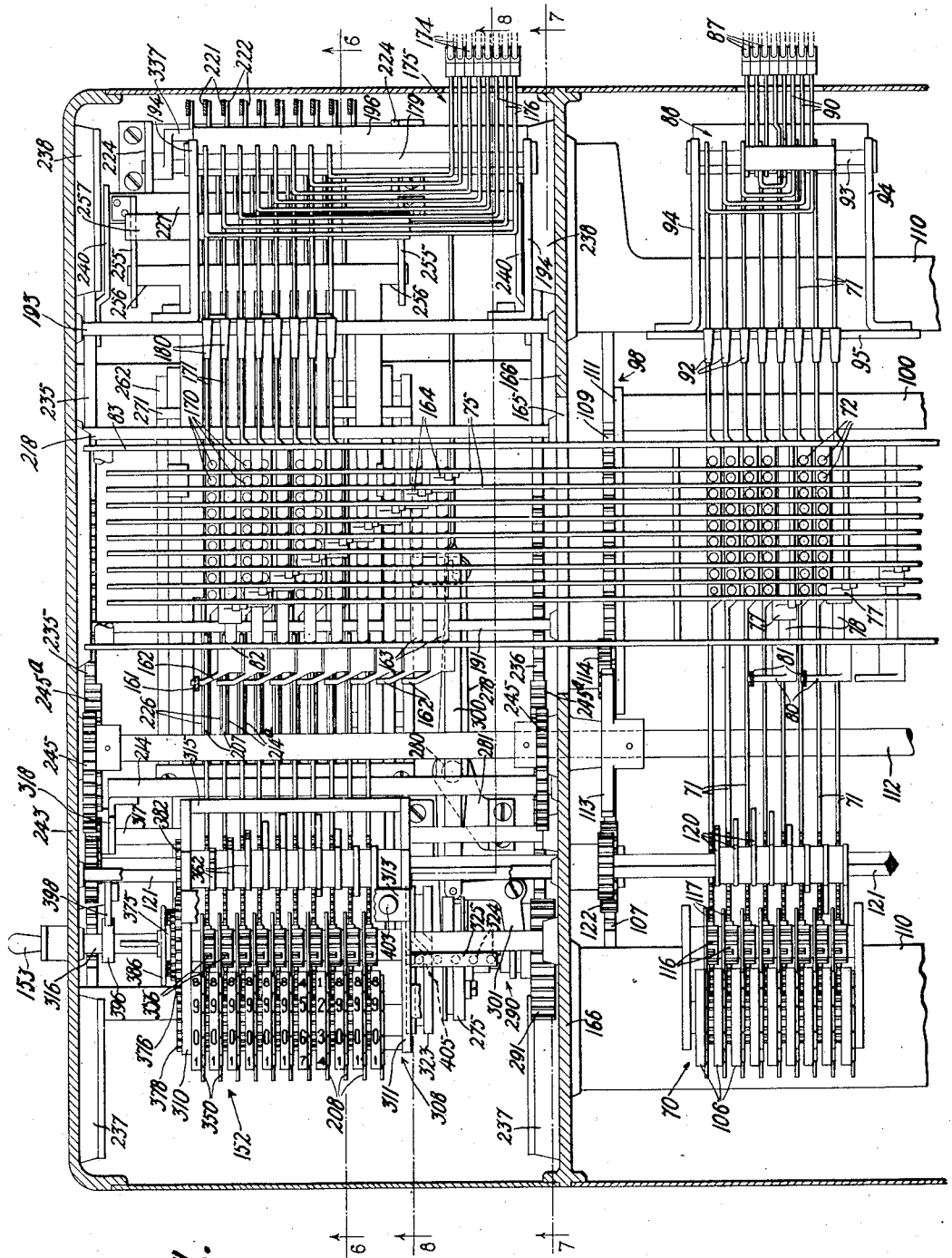
Figure 4 is a sectional top plan view of the machine, the section being taken on the line 4—4 of Figure 2.

By an inspection of Figures 1 and 4, it will be seen that the jacks 173 and the thrust-bars 174 of the denomination-selecting mechanism are considerably to one side of the associated denomination-selecting slides 171. This arrangement is used so that the denomination-selecting jacks 173 may be as near as possible to the side of the main frame 55 of the typewriting machine so as to be in range of the travel of the typewriter carriage of ordinary length.

To quickly locate the carriage in a selected position of the multiplication zone as well as in the addition zone, there is provided a regular denominational or decimal tabulator comprising keys 197 at the front of the machine (Figures 1 and 2), said keys being effective to depress key-levers 198 to raise denominational stops or plungers 200 at the rear of the machine, one at a time, according to the desired denomination, into the path of column-stops 201, the latter being adjustable to the proper columnar positions on a stop-bar 202 secured to the typewriter carriage 52. The addition selectors 84 and the multiplication selectors 172 are positioned with respect to their corresponding column stops so that each selector engages its associated set of jacks when the corresponding column stop co-operates with the denomination-selecting stops.

*Multiplicand indexing devices and product plates*

Figure 5:
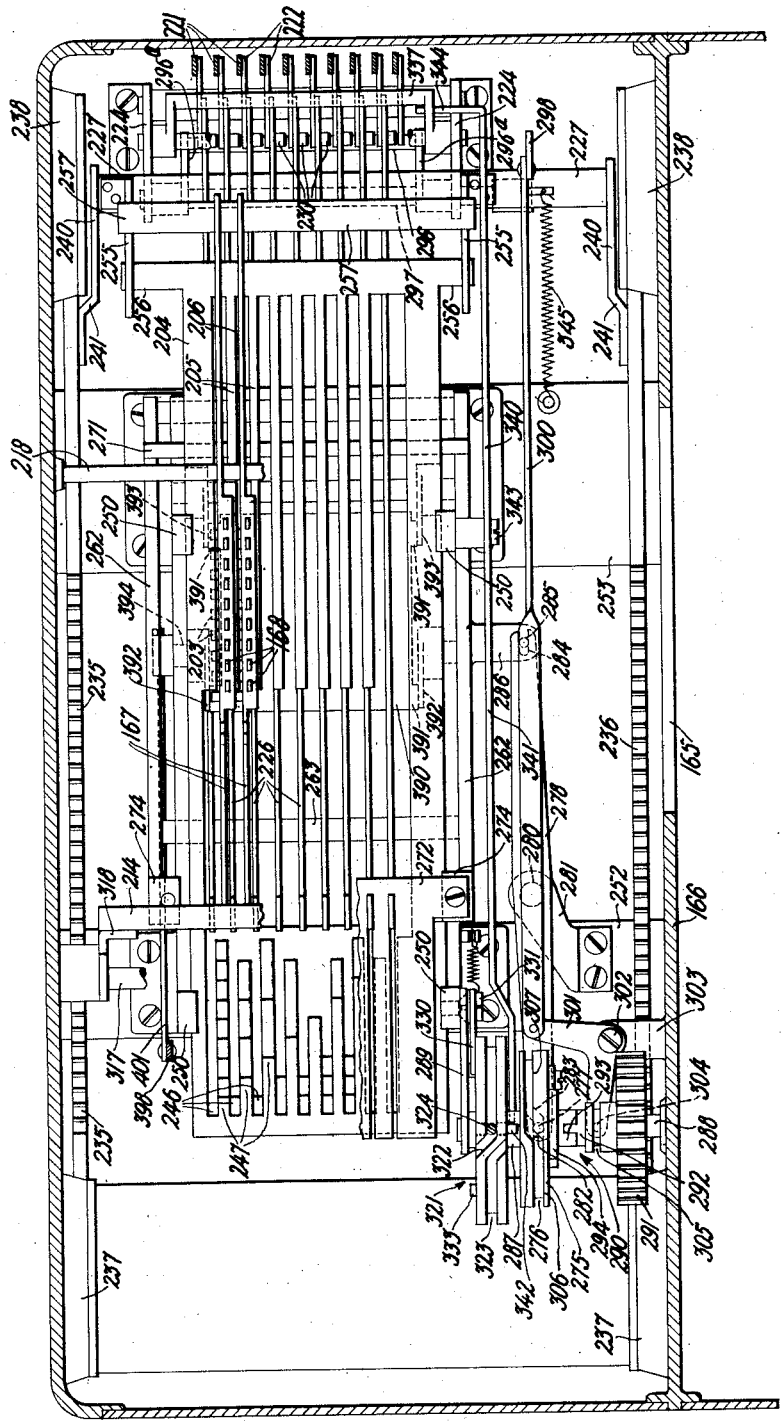
Figure 5 is a sectional top plan view of the multiplying section of the machine, the section being taken on the line 5—5 of Figure 2, the parts being shown in the position they occupy after running in the tens partial products.
Figure 6:
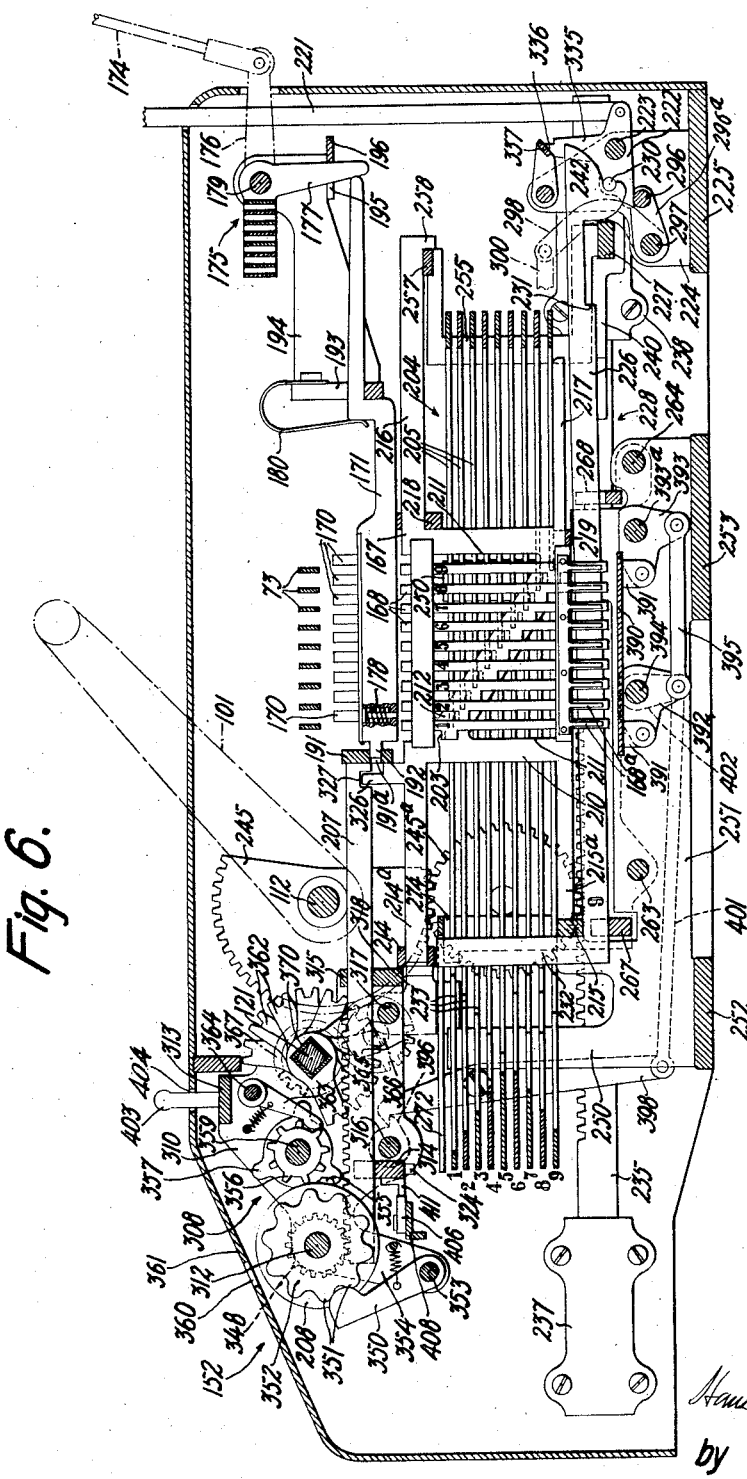
Figure 6 is a right-hand vertical sectional side view of the multiplying section, the section being taken on the line 6—6 of Figure 4.

Each indexing pin 168 is provided with a lip 203 extending laterally therefrom, or, in other words, at right angles to the direction of its setting movement (Figures 6, 12 and 13). The lips of the set of indexing pins of each multiplicand slide are disposed in different horizontal planes, and, due to this fact, and to the fact that the indexing pins are arranged successively behind each other, the lips fall in step-like arrangement relatively to each other. The indexing pins of equal value on the various multiplicand slides form rows extending transversely of said slides, and the lips 203 of each transverse row of indexing pins are disposed in the same horizontal plane (see Figure 16 also). Each transverse row of pins 168 has an actuable product plate 204 associated therewith, there being nine product plates since there are nine transverse rows of indexing pins. Each product plate 204 has forwardly-extending fingers 205 of equal length to co-operate with the lips 203 of the set indexing pins, to drive the multiplicand slides 167. Between the co-operating fingers 205 of each product plate are formed slots 206 (Figures 5, 12 and 19) in which the multiplicand slides are disposed. The forward ends of the sets of co-operating fingers of the product plates are arranged in stepped relation and the various sets of fingers are disposed in planes below the lips 203 of the associated indexing pins, and immediately behind said lips. When, however, the indexing pins are set, corresponding to the digits in the multiplicand, the lips 203 of said indexing pins occupy positions in the paths of their co-operating fingers 205, and, consequently, when the product plates are moved forwardly in the manner hereinafter described, the multiplicand devices having set indexing pins thereon are carried forwardly with said product plates to actuate rack-bars 207 to drive dial-wheels 208 of the product register 152.

Each multiplicand slide 167 comprises a rectangular middle section 210 (Figures 6, 12, 13 and 29), said middle section having two triangular cutouts 211 to diminish the weight of said slide; said triangular cutouts forming a diagonally-disposed bar 212 having slots 213 therein through which the lips 203 of the indexing pins extend, said slots being slightly elongated and the upper and lower ends thereof being engaged by the lips 203 to limit the up-and-down movements of the indexing pins 168. The diagonally-disposed bar 212 serves to reinforce the indexing pins to relieve them of strains transmitted to them, or, in other words, keep them from bending when they are engaged by the product plates to actuate said multiplicand slides 167. The multiplicand slides are guided by arms 214$^a$ and 215$^a$ (Figures 6 and 28) extending forwardly from their rectangular sections 210 and engaging in fixed slotted bars 214 and 215, respectively, and by arms 216 and 217 extending rearwardly from the sections 210, said arms 216 and 217 engaging in fixed slotted bars 218 and 219.

The lower guide-bars 215 and 219 (Figure 10) are secured to and form a tie-bar for side plates 251 having uprights 250 at their ends forming a frame in which the product plates 204 are mounted to slide forward and back in slots 254 formed in the uprights 250. The multiplier carriage is also supported in said frame, as hereinafter described. The side plates 251 are secured to cross-bars 252 and 253 of the bottom frame of the multiplication section. Guide-bars 214 and 218 are secured to the side wall 243 and the side wall or partition 166.

The product plates are provided at their forward ends with tens and units partial product shoulders 246 and 247, respectively, occupying different positions of the various product plates from "1" to "9", inclusive, as shown in Figures 19 to 27, inclusive. The arrangement of said shoulders with respect to each other and their functions are well known in the art, and it is deemed unnecessary to describe them in detail, but reference thereto will be made hereinafter in connection with the description of operation of the machine. Said shoulders determine the extent of movement given to the product plates 204 and the multiplicand slides 167 by their actuating devices when the general operator is actuated.

*Multiplier keys.*—The multiplier keys 151 may be actuated after the multiplicand has been set up. Said multiplier keys depress key-levers 220, pivoted on the fulcrum rod 155, against the tension of return springs 219$^a$. The rear ends of the key-levers 220 draw upwardly on links 221 to actuate intermediate levers 222 (Figures 4, 6 and 28) suitably spaced from each other on a fulcrum rod 223 supported by brackets 224 on a fixed cross-bar 225. All of the intermediate levers except the one connected with the "0" key have associated therewith multiplier devices or slides 226 which are all normally out of range of a cross-bar 227 on the actuating device or general operator 228, said general operator being actuable by means hereinafter described, including the actuating handle 101, located at the right-hand side of the machine in Figure 1. The multiplier slides normally rest, at their rear ends, on studs 230 extending from the intermediate levers 222 and are held in their ineffective positions by said studs, said studs being long enough, see Figure 5, to support the slides 226 in both lateral positions that they may occupy. When an intermediate lever is operated, however, by its connected multiplier key the associated multiplier slide 226 is lowered, at its rear end, to bring a shoulder 231 thereon into the path of the cross-bar 227 of the general operator. If the general operator is now actuated, the cross-bar 227 moves forwardly to carry the effective multiplier slide therewith. The multiplier slides are provided with upwardly-extending arms 232, and the arm of the driven slide engages product elements or shoulders 233 (Figures 6 and 19) formed on the forward ends of the product plates to drive said product plates forwardly, the fingers 205 of said product plates engaging the set indexing pins, as previously described, to drive the multiplicand devices 167, and actuate the dial-wheels 208 of the product register.

*General operator.*—The general operator of the multiplication section comprises two rack-bars 235 and 236 (Figures 5, 6, 7 and 14); each rack-bar being received in fixed guideways 237 and 238 at the front and rear respectively, secured to walls 166 and 243. Brackets 240 are secured to the rack-bars near their rear ends to support the crossbar 227 of said general operator; said brackets being bent inwardly at 241 (Figure 5) to clear the guideways. The crossbar 227 is effective as hereinbefore described to drive the effective one of the multiplier slides, said crossbar, during such operation, passing freely under the ineffective multiplier slides 226, and locking them to prevent the premature operation of another multiplier key due to the connection of pins 230 with the slides 226. The crossbar 227 is also effective to return the actuated multiplier slide, said bar engaging for this purpose, during the return stroke of the general operator, an extension 242 on the multiplier slide.

The connection between the operating handle 101, (Figures 1 and 6) comprises the rock shaft 112 to which said handle is secured and which extends through the partition 166 (Figure 4), said shaft being journaled in said partition, the left end wall 243 of the multiplication section and the right end wall 244 of the addition section. Said rock-shaft 112 is provided with two sectors 245 to drive intermediate pinions 245ᵃ meshing with the rack-bars 235 and 236 of the general operator to drive the latter forwardly when the handle 101 is pulled forward.

From the foregoing, it will be understood that the adding section 41 is provided with indexing devices for setting up numbers, that the multiplication section is also provided with indexing devices for a similar purpose, that the indexing devices of both computer sections have computing devices associated therewith, that each computer-section has a general-operator to actuate its computing devices through the medium of the set indexing devices, and that both general operators are actuated by the shaft 112 which is herein actuated by the operating handle 101.

To assist in a further description of the machine, an example, given below, is referred to.

Let it be assumed that 7324 is to be multiplied by 9. The digits of the multiplicand when multiplied by 9 give the following products:

```
63
27
18
36
```

The product of each digit of the multiplicand when multiplied has a tens partial product (the 6 of 63), and a units partial product (the 3 of 63). Thus all of the tens partial products equals 6213, and all of the units partial products equals 3786. In the present machine the general operator is actuated twice for each digit of the multiplier, the first actuation being effective to run into the register the tens partial products (6213), the second actuation being effective to run into the register the units partial products (3786). Thus these partial products are run into the register and added to each other in the following order:

```
7324
   9
-------
6213   tens partial products
3786   units partial products
-------
65916
```

To run in the tens partial products and then the units partial products, the product plates 204 are provided with complementary tens shoulders 246 and units shoulders 247 representing partial products (Figures 5 and 19 to 27 inclusive), the shoulders on the "1" product plate representing all the products from 1 × 1 to 1 × 9 inclusive, those of the "2" product plate representing all the products from 2 × 1 to 2 × 9 inclusive etc., the values of the tens shoulders 246 being indicated by small numerals at the front of said shoulders, and the values of the units shoulders 247 being indicated by small numerals at the rear of said shoulders. In other words, the product plates of which there are nine represent all the products from 1 × 1 to 9 × 9 inclusive, it being possible with this arrangement to multiply any two numbers having a product within the capacity of the register. The upright arms 232 of the multiplier slides engage, during the first actuation of the general operator, the tens shoulders 246 to run in the tens partial products. The multiplier slides 226 are then automatically shifted sidewise by means hereinafter described actuable by the general operator during the early part of its second actuation to position said multiplier slides opposite the units shoulders 247. The units partial products are then run in. The register carriage is also fed one space to the left of the machine so that the units partial products may be added to the tens partial products in the relation shown in the foregoing illustration.

There are nine product plates as above intimated, one being associated with each transverse row of indexing pins 168. In other words, there is one product plate associated with the row of "1" pins, one product plate associated with the row of "2" pins etc. These product plates are arranged beneath each other in ascending numerical order, the "1" plate being uppermost and the "9" plate being lowermost. Said plates have the same general outline, except for the fingers 205, which extend forwardly different distances as hereinbefore described, as shown in Figures 6 and 19, and the partial product shoulders which are arranged differently as indicated in Figures 19 to 27 inclusive. The product plates are guided at their side edges in uprights or standards 250 (Figures 6, 9, 10 and 14) of plates 251 secured to cross-bars 252 and 253 fixed between the end wall 243 and the partition 166, said standards being provided with slots 254 to receive the product plates. Said cross-bars 252, 253 may form part of a frame fixed within the base. Thus it will be understood that the guiding means for the product plates and the guiding means for the multiplicand slides 167 are relatively fixed, and, consequently, the co-operating fingers are caused to engage properly, and remain in engagement with the lips 203, of said indexing pins, during the forward movement of said products plates.

To restore the actuated product plates 204 and the actuated multiplicand slides 167 with the actuated multiplier slide 226, the general operator is further provided with means including two uprights or standards 255 (Figures 5, 6, 9, and 15) secured to the cross-bar 227, said standards engaging with shoulders 256 formed on the sides and near the rear of said product plates to push them back to their normal positions. Said uprights have secured thereto a cross-bar 257 to engage projections 258 of the multiplicand slides 167 to restore them to their normal positions. To avoid obstruction of the standards 255, the upper rear guide bar 218 of the multiplicand slides is provided with two slots or cut-outs 260 as shown in Figure 16.

*Multiplier carriage.*—To position the multiplier slides 226 relatively to the partial products shoulders 246 and 247 they are carried by a reciprocable support 261 hereinafter referred to as a multiplier carriage since it carries the multiplier slides. The multiplier carriage (Figures 5, 6, 9, 11 and 16) comprises end plates 262 joined to each other at the front and back by cross-bars 263 and 264 respectively, said bars being slidingly supported in holes 265 and 266 (Figure 10) in the fixed brackets or end plates 251, which support the product plates 204. The end plates 262 of said carriage (Figure 11) are further connected to each other at the front and at the rear by bars 267 and 268 having slots 270 and 271 therein to guide the multiplier slides 226; the slots 271 being deep enough (Figure 6) to permit the rear ends of the multiplier slides 226 to be set into effective relation with the cross-bar 227 of the general operator. The multiplier slides are further guided by a plate 272 having slots 273 therein into which the arms 232 of the multiplier slides extend, the guide plate 272 being secured to upward extensions or standards 274 at the forward ends of the end plates 262. Thus it will be understood that the multiplier carriage 261 is mounted on the fixed guide brackets 251 that support the product plates 204, and that said carriage may be cammed sidewise in a manner hereinafter described, to position multiplier slides 226 to engage with tens partial products shoulders 246 and the units partial products shoulders 247. The guiding bar 215, which is secured to the fixed brackets 251, also serves to hold the multiplier slides 226 in the slots 270 of the guide bar 267 and arrests them in their normal positions.

Figure 14:
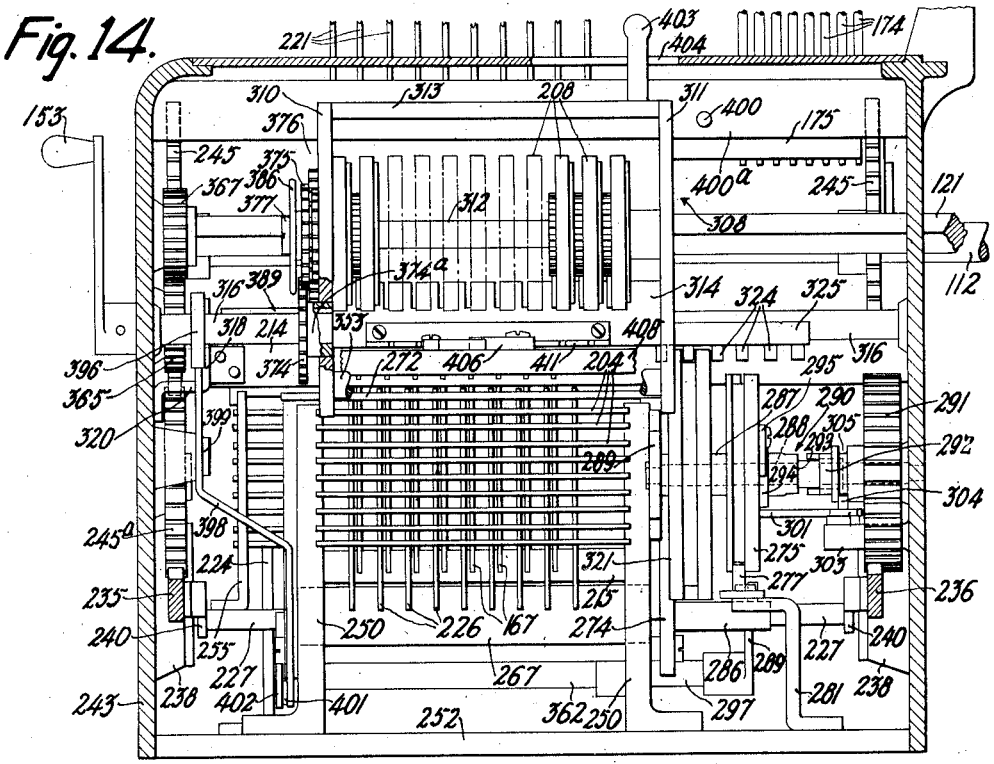
Figure 14 is a sectional front view of the multiplying portion of the machine, the section being taken on the line 14—14 of Figure 7.
Figure 15:
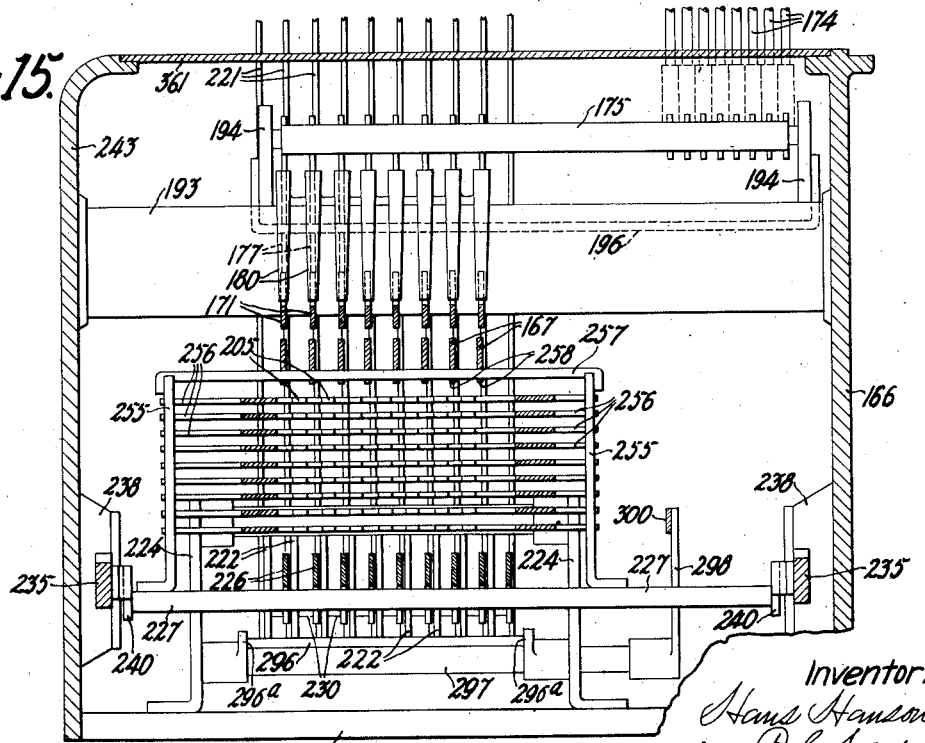
Figure 15 is a view similar to Figure 14, the section being taken on the line 15—15 of Figure 7.

The camming means for the multiplier carriage comprises a circular cam-head 275 (Figures 5 and 8) having a groove 276 in its periphery, into which a pin or stud 277 extends upwardly from a lever 278 pivoted at 280 to a fixed bracket 281 rising from the cross-bar 252 which forms part of the frame of the machine. In the groove 276 are provided two cams 282 and 283 to engage the stud 277 to swing said lever back and forth about its pivot, to actuate the multiplier carriage and thus position said multiplier slides as above mentioned. The connection of the lever 278 to the multiplier carriage may comprise a slot 284 at the rear end of said lever to receive a pin 285 extending from a lug 286 on the right-hand end plate 262 of the multiplier carriage.

the multiplier carriage-reciprocating cam-head 275 is secured to a hollow shaft or sleeve 287 to rotate on a rod 288 supported in the partition 166 and in a bracket 289 secured to the fixed standard 250. Said cam-head is normally disconnected as shown in Figures 4 and 14 and may be driven through the medium of a clutch 290 by a gear 291 meshing with the right-hand rack-bar 236 of the general operator. The clutch comprises two co-operating elements 292 and 293, one element 292 being connected with the gear 291, and the other element 293 being connected with a ratchet-wheel 294 having two teeth diametrically opposite engaging a spring-pressed pawl 295 (Figures 7 and 14) pivoted on the cam-head 275; said pawl and ratchet-wheel forming a one-way driving connection between the cam-head 275 and the clutch 290 to enable the general operator to return to normal after each actuation thereof independently of the cam-head 275. The ratchet-wheel is so positioned relatively to the pawl 295 after each actuation as to be ready to drive the cam-head 275 one-half of a revolution on the succeeding actuation of the general operator, it being understood that the gear 291 is of such size that it makes only one-half of a revolution at each actuation of the general operator. The gear 291 is slidingly mounted on the rod 288 so that it may be moved toward the cam-head to close the clutch, and thus establish a connection between the latter and said gear; the gear being broad enough to remain always in engagement with the rack 236.

To establish the connection between the cam-head 275 and the gear 291, or, in other words, close the clutch 290, there is provided a universal bar 296 (Figures 5, 6 and 15) to be actuated by any one of the intermediate levers 222 connected to the multiplier-keys 151. Said universal bar, carried by two arms 296ª, is secured to a rock-shaft 297 pivotally mounted on the brackets 224, said rock-shaft being provided with an upwardly-extending arm 298, which, when a multiplier key 151 is depressed, pulls a link 300 rearwardly to swing a bell-crank 301 about a stud 302 on a lug 303 of the partition 166. The forward end of the bell-crank is provided with a pin 304 (Figures 5, 7 and 14) engaging in an annular groove 305 formed in the clutch-member 292 to actuate the latter and close the clutch 290.

The multiplier carriage normally occupies the position shown in Figure 14, with the arms 232 of the multiplier slides opposite the units complementary shoulders 247, as shown in dotted lines in Figure 19, where they are left at the end of a complete multiplying operation. The cam 282 of the carriage-reciprocating cam-head 275, which is normally at the bottom of the latter, is effective during the early part of the first actuation of the general operator and consequent half revolution of the cam-head 275, while a multiplier key is depressed, to shift the multiplier carriage to the left and thereby position arms 232 of the multiplier slides 226 so that they may engage the tens shoulders 246 of the product plates 204. This shifting of the multiplier slides is accomplished before the effective one of said slides is actuated by the general operator, there being sufficient lost motion for this purpose between the cross-bar 227 of the general operator (Figure 6) and the shoulders 231 of the multiplier slides. After the tens partial products have been run into the register (6213 of the above example), the parts are left in the position shown in Figure 5. The general operator is then again actuated, but this time the other cam 283 of the cam-head 275 is brought into action to shift the multiplier carriage towards the right of the machine, to carry the multiplier slides into co-operative relation with, or, in other words, set them that they may engage the units shoulders 247 of the product plates. The effective multiplier slide is then again driven by the general operator to actuate the product plates to run in the units partial products. The multiplier carriage is held against accidental displacement by means of the cam-element 275, when the parts are in normal position and also while the effective multiplier slide is being operated, by non-cam portions 306 and 307 of the groove 276 in which the pin 277 of the carriage actuating lever engages.

*Product register.*—The product register 152 comprises a carriage 308 having side walls 310 and 311 (Figures 4, 6, 7, 14 and 28) to support a rod 312 upon which the dial-wheels 208 are supported. Said register carriage is fed one denominational or decimal position to the left of the machine during the early part of the second actuation of the general operator, or, in other words, immediately prior to the running in of the units partial product (3786), so that they may be added to the previously run in tens partial product (6213) as indicated in the above example. In other words, each digit of the units partial product is added to the digit of next lower denominational order of the tens partial product. The register carriage also comprises an upper cross-bar 313 and two lower cross-bars 314 and 315, fastened between the side walls 310 and 311, said lower cross-bars serving to support and guide the rack-bars 207. The register carriage is arranged to be moved leftwardly and rightwardly of the machine on a shaft 316 and a fixed rod 317, the shaft 316 extending between the partition 166 and the left wall 243 of the multiplying section; the bar 317 being supported at one end by the partition 166 and at its other end by a bracket 318 secured to the left wall 243. Said bracket also supports the left end of the guide-bar 214 for the multiplicand slides. It is bent off at 320 (Figure 14) to provide a space between the ends of the bars 214 and 317 and the wall 243, the space being occupied by the sector 245 and a pinion meshing therewith.

The feeding mechanism for the register carriage comprises a register-feeding element 321, which is also secured to the hollow shaft 287 and rotates with the multiplier carriage cam-head 275. This being the case, said register-feeding element is given a half revolution during the first actuation of the general operator, thus bringing a cam 322 in a peripheral groove 323 in said element to the position in Figure 5; said cam being normally at the under side of said element, as shown in Figure 4. In being brought to this position, the cam 322 has not functioned but stands ready to engage one of the teeth 324 of a rack 325 forming an extension of the bar 314 (Figure 14), during the early part of the second actuation of the general operator, to feed the register carriage one step or digit position to the left of the machine to the next denominational position. This is done to connect the multiplicand slides 167 each with the dial driving rack-bar 207 of next lower denominational order. It will be remembered that there is sufficient lost motion between the cross-bar 227 of the general operator and the shoulder 231 of the effective multiplier slide. This permits a partial rotation of the register-feeding element 321 prior to the actuation of said multiplier slide; consequently, the register carriage is fed to the next position to change the rack connections before the racks 207 are driven. For the purpose of actuating the dial-driving racks 207 by the effective multiplicand slides 167, and for permitting the shifting of said racks transversely by said slides, each time the product register carriage 308 is shifted in one direction or the other, the slides 167 are provided with upwardly-extending fingers, tongues or pins 326 which pass through slots, grooves or cut-outs 327 near the rear ends of said dial-driving racks when the latter are shifted sidewise with the register carriage. Any of the racks in engagement with the fingers 326 of the effective slides 167 are driven forward and back by said slides when they are actuated (Figures 6, 12 and 28).

The multiplier carriage cam-head 275 and the register carriage-feeding element 321 are held against accidental displacement in both positions to which they may be rotated by means of a spring-pressed detent lever 330 (Figures 5 and 8) pivoted on a stud 331 passing through a hole in the bracket 289 and threaded into the forward right-hand upright 250, said detent lever being provided with a notch 332 to engage either one of two pins 333 extending laterally from the left-hand side of the register-feeding element 321.

To further illustrate the operation of the machine let it be assumed that the multiplier has more than one digit, as in 95, instead of a single digit (9) given in the above illustration. The register carriage having been returned to its extreme right, the operative first actuates the "9" multiplier key, and then actuates the general operator twice, as before described, thus leaving the multiplier carriage in such position that the multiplier slides with their arms 232 are opposite the units partial product shoulders 247, and the cam 322 of the register carriage-feeding element is substantially a half revolution away from the teeth 324 of the register feed-rack 325. The operative then actuates the "5" multiplier key, and proceeds to run in the tens partial products. During the early part of this actuation of the general operator, the multiplier slides are shifted into effective relation with the tens partial product shoulders 246, the register carriage remaining unshifted during this actuation of the general operator. Thus the register carriage occupies the same position for the tens partial products of the digit "5" of the multiplier as it occupied for the units partial products of the digit "9". Said carriage is shifted, however, at the next actuation of the general operator prior to the running in of the units partial products of the digit "5". The carriage is left in this position to receive the tens partial products of the next digit, if the multiplier should have a greater number of digits than above indicated.

From the foregoing, it will be understood that only one multiplier slide 226 is effective at a time; that all of the product plates 204 may be actuated by any one of the multiplier slides to drive the multiplicand slides 167 having depressed indexing pins 168 to actuate the dial-wheels 208 of the register, and that the product plates are moved different distances according to the partial product shoulders engaged by the effective multiplier slide. A simple multiplying operation is shown in Figures 28 and 29. Figure 28 shows a multiplicand (7) set up on one of the multiplicand slides 167 and the latter driven by the "9" multiplier slide 226 through the medium of the "7" product plate 204 to indicate the tens partial product (6) on the dial-wheel 208. It will be understood that, although all of the product plates have been actuated in Figure 28, only the "7" product plate has been effective to give a result, due to the fact that it is the only plate having an indexing pin 168 set in co-operative relation therewith. Figure 29 shows the position of the product plates when actuated for the units partial product by the "9" multiplier slide, the "7" product plate being advanced only three digit positions through the connected multiplicand slide and associated rack-bar to indicate the units partial product (3) on the dial-wheel of next lower denominational order to the one shown in Figure 28, the register carriage having been fed leftwardly of the machine as above described.

*Locking devices for multiplier keys and multiplier slides.*—It is desirable to maintain the effective multiplier slide 226 in co-operative relation with the general operator, or, in other words, prevent its disengagement from the general operator until the units partial products have been run into the register. For this purpose, the intermediate levers 222, connected to the multiplier keys 151 and by which said multiplier slides are set into co-operative relation with the cross-bar 227 of the general operator, are locked in their actuated positions, one at a time, according to the multiplier key depressed. To his end, each intermediate lever 222 has an upwardly-extending arm 335 (Figures 5 and 6) having an inclined face 336 engaging a spring-pressed bail 337, pivoted on the brackets 224, to enable the end of said arm to snap behind, and be held by said bail as in Figure 28, when the intermediate lever is moved to its actuated position. It will be understood that, since the intermediate levers actuate the universal bar 296 to close the clutch 290, the latter will also be held effective by means of the locking bail 337. The construction of the universal locking bar 337 and the arms 335 of the intermediate levers is such that an erroneously actuated multiplier key may be released, by the actuation of the correct one, and restored prior to the actuation of the general operator; the locking bar 337 being raised high enough by the intermediate lever 222 when a multiplier key is depressed to allow the intermediate lever of a previously depressed multiplier key to snap past said locking bar to normal position under the influence of the return spring 219ª of the key connection.

It is desirable to release the intermediate lever associated with the actuated multiplier key at the end of each multiplying cycle, or, in other words, each complete multiplying operation by a single digit, to restore the machine to its normal condition, since any digit may be the last one of a series in the multiplier. To this end, there is provided a release lever 340 (Figures 5 and 7) having at its forward end a nose 341 to be engaged, during the latter part of the second return stroke of the general operator, by a releaser pin 342 extending laterally from the register feeding element 321 to swing said release lever about a pivot 343 on the standard 250, to raise its rear end. Said rear end of the lever 340 has a lateral extension or lip 344 engaging under one of the supporting arms of the locking bar 337 to swing said bar about its pivot, and out of engagement with the arm 335 of the actuated intermediate lever 222, thus allowing the latter to be restored to normal position by the spring 219ª of the connected multiplier key lever; consequently, the associated multiplier slide 226 is raised, by means of the stud 230 of the intermediate lever, out of effective relation with the cross-bar 227 of the general operator. The clutch-actuating universal bar 296 is also allowed to return to normal position under the influence of a spring 345 (Figure 5), connected to the link 300 of the clutch-actuating connection, to open the clutch 290 and thus break the connection between the general operator and the multiplier carriage-reciprocating cam-head 275 and register-feeding element 321. The "0" multiplier key functions like any one of the other multiplier keys to close the clutch 290 (Figure 5), but it has no multiplier slide associated therewith. Consequently, there are no numbers run into the register when the general operator is actuated subsequently to the depressing of said "0" key. It is necessary, however, to actuate the general operator subsequently to the actuation of the "0" multiplier key just the same as following the actuation of any other multiplier key, to feed the product register one denominational position.

The dial-wheels 208 of the product register have one-way driving connections comprising spring-pressed pawls 346 and ratchet-wheels 347 (Figure 17) with the pinions 348 driven by the rack-bars 207. These one-way connections may be similar to those associated with the dial-wheels of the adding section 41, and shown in my patent No. 905,421, dated December 1, 1908. The pinions 348 are always in mesh with the racks 207 to drive said dial-wheels 208 in a clockwise direction. Said dial-wheels 208 are held against accidental displacement by spring-pressed detents 350 (Figure 6) engaging between teeth 351 of ten-toothed gear wheels 352, secured to said dial-wheels 208, said detents being pivotally supported and suitably spaced from each other on a bar 353 supported by downwardly-extending arms 354 of the side walls 310 and 311 of the product register.

*Tens carry-over mechanism.*—The tens carry-over mechanism is similar to that of the register in the adding section, and comprises a carry-over-initiating tooth 355 on each dial-wheel (Figure 6) to engage a pinion 356 to set a three-toothed gear wheel 357 into effective relation with a ten-toothed gear wheel 352, secured to the dial-wheel of next higher denominational order, when the dial-wheel passes from "9" to "0" at the sight-opening 360 in the cover plate 361, and also set the pinion 356 into effective relation with one of a series of spirally-arranged carry-over completing arms 362 on the carry-over shaft 121. The carry-over action is completed by said arm during the return stroke of each actuation of the general operator, by further rotating the pinion 356. The pinions 356 are supported on a rod 359 and are held against accidental displacement by spring-pressed detents 363 to swing about a rod 364, said rod and the rod 359 being supported on the side walls of the product register. The carry-over shaft, in addition to being driven at one end by the gear 122 and the pinion 123, in Figure 31, is driven at its other end, near the wall 243 of the multiplying section, by means comprising a pinion 365 (Figures 6, 9 and 14) meshing with the gear sector 245 on said shaft 112, said intermediate pinion 365 rotating on a headed stud 366 secured to the end wall 243 of the multiplying section. Said pinion 365 meshes with a pinion 367 on the carry-over shaft 121, which has a one-way driving connection with said shaft 121 for driving the latter on the return movement of handle 101.

The carry-over completing arms 362 of the product register have a sliding connection with the carry-over shaft 121, to enable them to travel lengthwise of the carry-over shaft with said register. To this end, said arms are supported on a square sleeve 370 (Figures 6 and 17) held between the end wall 311 and a ball-clutch device 371 having a groove 372 in which the other wall 310 of the product register engages.

After a product has been obtained, it may be copied by the typewriter keys on the work-sheet around the platen. The multiplier section may then be cleared by restoring the product register to zero and thus wiping out the product. The indexing pins may also be restored to wipe out the multiplicand. Both of these operations may be accomplished simultaneously in the following manner.

Figure 17:
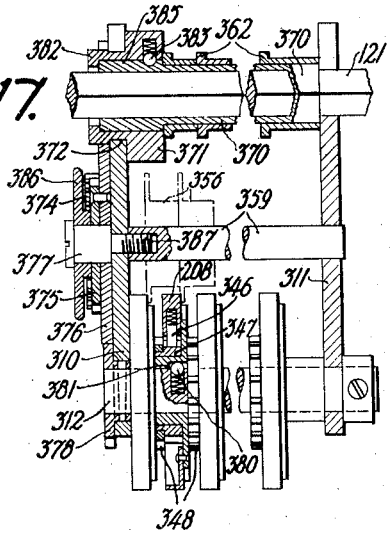
Figure 17 is a sectional detail top plan view, showing the connection between the zero setting mechanism to the dial-wheels and to the carry-over devices.
Figure 18:
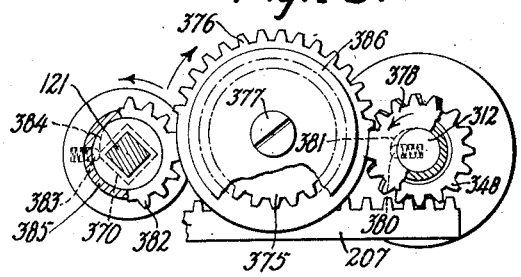
Figure 18 is a left-hand side view of the part shown in Figure 17.

*Zero setting and indexing pin restoring.*—
To restore the register to zero, there is provided the handle 153 (Figures 2, 4 and 14) secured to the shaft 316 to drive a pinion 374 slidable on said shaft and meshing with an intermediate pinion 375 secured to a mutilated gear 376 having teeth on substantially half of its periphery, said pinion and gear being adapted to rotate on a stud 377, and to be driven in a clockwise direction, Figures 2 and 18, when the handle 153 is turned in a counter-clockwise direction. This rotates a pinion 378 secured to the dial-wheel shaft 312 in a counter-clockwise direction. Each dial-wheel has a one-way connection in the form of a spring pressed ball 380, which may be like that shown in my Patent No. 905,421, engaging in a depression 381 in the dial-wheel, said ball connections enabling the dial-wheels to be rotated by their racks 207 independently of the shaft 312 during computing operations. When said shaft is rotated by the handle 153, however, the dial-wheels are caused, as soon as the balls drop into the notches, to travel with said shaft and restore all of the dial-wheels, excepting the unit dial-wheel, to "9", the units dial-wheel being restored to "0". After the dial-wheel shaft 312 has made a complete revolution, the mutilated gear-wheel 376 stops rotating said shaft and locks it against accidental rotation. Said gear then engages and rotates a pinion 382 formed on the clutch device 371 supported on the carry-over shaft 121 (Figures 17 and 18). Said clutch device comprises a spring-pressed ball 383 engaging in a depression 384 formed in an enlarged circular portion 385 on one end of the square sleeve 370, said groove being formed to enable the carry-over shaft and the sleeve 370 to be rotated independently of the pinion 382 during an ordinary carry-over operation. When said pinion is rotated by the mutilated gear 376, however, the ball 383 causes the sleeve 370 and shaft 121 to be rotated therewith to actuate the carry-over completing arms 362, each arm being effective, in ascending denominational order, to co-operate with its associated intermediate carry-over pinion 356, to rotate the associated dial-wheels 208 through one digit position, thus restoring all of the dial-wheels to "0" except the units dial-wheel which, it will be remembered, is restored to "0" during the actuation of pinion 378. It will be understood that, if all of the dial-wheels were restored to "0" directly by the dial-wheel shaft, the carry-over pinions would be actuated and left in an abnormal position. Consequently, all of the dial-wheels are restored to "9", except the units dial-wheel, by means of the dial-wheel shaft. By setting the units dial-wheel to "0", the carry-over pinion is set to be further actuated by the associated carry-over-completing arm, to rotate the tens dial-wheel to "0", and, as each dial-wheel is restored from "9" to "0", the carry-over action to the dial-wheel of next higher order is initiated by the active dial-wheel and completed by the carry-over-completing arm until all of said dial-wheels stand at "0". It will be seen, by an inspection of Figure 18, that both pinions 378 and 382 have non-toothed portions, which normally engage the non-toothed portion of the gear 376; consequently, said pinions are held against accidental displacement. The gearing is such that a complete rotation of the shaft 316 causes a complete rotation of the gear 376, the latter being effective to rotate, during its revolution, the pinions 378 and 382 successively.

A sliding connection, comprising a spline 389 (Figures 4 and 14), is provided between the shaft 316 and the pinion 374, to enable said pinion to travel lengthwise of the shaft 316 with the product register. The spline extends through a hub 374ª (Figure 14) of said pinion 374, the hub fitting into a hole in the side wall 310 of the product register. To cause said pinion 374 to travel with said product register, there is provided a disk 386 on the stud 377, said disk overlapping the pinion, as indicated in Figure 14. The pivot-stud 377 is in the form of a shouldered screw, which has a reduced portion 387 (Figure 17) extending through a hole in the end wall 310 of the product register, and is threaded into the rod 359 which supports the carry-over pinions 356; the pinion 375 and mutilated gear 376 being free to rotate on said stud 377.

To clear the machine of the multiplicand set up on the multiplicand slides, there is provided a platform 390 arranged beneath the indexing pins 168 (Figures 2, 5, 6 and 16), by which the indexing pins may be restored. Said platform comprises downturned ears 391 by which the platform is mounted on two bell-cranks 392 at the front and two bell-cranks 393 at the rear. The front bell-cranks 392 are secured to a shaft 394 which may be actuated to rock said bell-cranks to move the bell-cranks 393 in parallelism therewith by connecting links 395, the bell-cranks 393 being pivoted on a rod 393$^a$. Thus the pin-restoring platform 390 is raised to push all of the set indexing pins back to normal.

The actuating mechanism for the pin-restoring platform 390 comprises a cam 396 (Figures 2, 6 and 14) on the zero-setting shaft 316, to engage the nose 397 of a lever 398 to swing the latter about a pivot comprising a stud 399 secured to wall 243 of the multiplying section. The lever 398 is connected at its lower end with a link 401 extending rearwardly to an arm 402 secured to the shaft 394 to rock the latter. By an inspection of Figure 2 it will be understood that the cam 396 normally engages the lever under the nose 397 of lever 398, thus preventing the zero-setting handle 153 from being rotated in the wrong direction. The platform 390 may be restored to normal by gravity or any other suitable means.

The product register may be returned to its normal position, toward the right of the machine, by a handle 403 (Figures 3 and 6) extending through an opening 404 in the top plate 361 of the multiplying section. It may be arrested in this position by a stop 400 on a fixed bar 400$^a$ (Figures 7 and 14). To enable said register to be restored without obstruction by the register feeding element 321, the latter is provided with a transverse slot 405 in its periphery which normally registers with the teeth 324 of the register feeding rack (Figures 4, 5 and 7). The register carriage is held against accidental displacement, when the slot 405 registers with the rack teeth, by a spring-pressed detent 406 (Figures 6 and 30) pivoted at 407 on a fixed cross-bar 408 extending between the partition 166 and the end wall 243 of the multiplying section, said detent engaging in notches 410 formed on the horizontal flange 411 of an angle-bar 412 secured to the front cross-bar 314 of the register carriage.

*Non-compute key.*—It will be understood that when the non-compute key 137 is operated the multiplying mechanism is also rendered ineffective by throwing the cam roller 169, which is engaged by the multiplication selector 172, out of co-operative relation with said selector in a manner similar to that described in connection with the cam rollers 89 for the adding mechanism. The non-compute key may be held in its operated position indefinitely by a pin 413 (Figure 2) extending from the side of the thrust bar 138, said pin engaging in a depression 414 at the rear end of an elongated slot 415 formed in the casing. To release the non-compute key and thus render the machine effective for computation, it is merely necessary to raise the pin 413 out of the depression 414 so that the non-compute key may be restored to normal position by the spring 144$^a$.

To enable the machine to set horizontally on a table, there are provided beneath the adding section 42 and at the right-hand side of the machine, feet 420 since the bottom of the multiplying section 42 is somewhat below that of the adding section 41. It should be understood that said feet are not necessary when the machine is supported on a stand like the regular Underwood bookkeeping machine. In the latter case the adding section may rest directly on the table of said stand and the multiplying section may extend down at one side of said table.

It will be understood that the invention is capable of such an operation that it would not be necessary for the operative to set the register to a predetermined position dependent upon the number of digits in the multiplier. It would only be necessary to move the product-register, by means of the handle 403, to the right of the machine, until it is arrested by the stop-pin 400 (Figure 14). When in such operation the product-register is so located, seven dial-wheels are visible at the sight-opening 360 (Figure 3) and four dial-wheels are covered, or, in other words, to the right of the sight-opening. When under these circumstances the product register is in this position the dial-driving rack-bars 207 associated with the three dial-wheels to the right of the product-register are located to the right of the set of multiplicand-slides 167, all the other dial-driving racks being in effective relation with the multiplicand-slides. It will be understood that in this way the three rack-bars may if desired be brought into co-operative relation one at a time with the multiplicand-slides at each complete multiplying operation by a single digit of the multiplier. It will be understood that under such circumstances the maximum number of digits of the multiplicand may be one less than the number of dial-wheels exposed at the sight-opening at the beginning of the multiplying operation. In Figure 3, which illustrates this method, the product-register has been fed one step to the left of the machine due to a multiplying operation by a single digit, the number 63 indicated in the product register occupying only two denominational spaces.

It should be understood, however, that the following preferred method of locating or positioning the product register for a new multiplying operation may also be employed. The product register may be at the extreme left, thus exposing all of the dial-wheels 208. It may then be moved from this position step by step, to the right, as many steps as there are digits in the multiplier. For example, if the multiplier were 390, the product register would be moved three steps to the right. It will be remembered that during the multiplying operations, the carriage is fed step by step to the left, one space for each digit of the multiplier, thus, after multiplying by 390, the carriage will again occupy its extreme left-hand position with all of the dial-wheels at the sight-opening. With this method the product register at the end of a multiplying operation is left in a position from which it may be moved to the right according to the number of digits in the multiplier to begin the next multiplying operation.

*Operation.*—A more condensed description of a multiplying operation will now be given, and more particularly in connection with the method of locating the product-register with all of the dial-wheels visible at the sight-opening 360 at are beginning of a multiplying operation. Let it be assumed that the product-register is in its normal position with the dial-wheel of lowest order in co-operative relation with the units multiplicant slide 167 and that it is desired to multiply 7324 by 9. The operative first moves the product-register one step or denominational position to the right of the machine by means of the handle 403. The typewriter carriage is then moved by hand, or by the decimal-tabulating mechanism, to the thousands denominational position in the multiplying zone, in the same manner as in adding operations. The multiplying denomination-selector causes the intermediate bar 171 of the same denominational order (thousands) to move forward sufficiently to bring its pins 170 into register with the pin-setting bars 73. If the multiplicand is to be typed with the typewriter-numeral-keys, the "7" numeral-key 43 is operated to type the 7 on the work-sheet, and, at the same time, the key actuates its associated pin-setting bar 73 to depress a pin 170 which, in turn, depresses the indexing pin 168, said indexing pin having the value of 7 and being the 7th pin from the front of the set of indexing pins on the multiplicand slide, as indicated in Figure 6. The slide 167 is the 4th from the right-hand side of the machine, and is of thousands denominational order. The other numeral keys "3", "2" and "4" are then operated successively in the usual way. As each key is operated, the typewriter carriage is fed step by step in letter-feeding direction, and the digits 3, 2 and 4 are typed, and, at the same time, the indexing pins 168 of corresponding values are set on the sildes 167 of hundreds, tens and units denominational order, respectively. The multiplicand 7324 has now been typed and also set up by means of the indexing pins on the multiplicand slides.

The "9" multiplier key 151 is now operated, thus causing the rear end of its key-lever 220 to draw the link 221 upward, thereby actuating the intermediate three-armed lever 222 and lowering the multiplier slide 226 into co-operative relation with the cross-bar 227 of the general operator, so that the general operator, when actuated, may engage the shoulder 231 of said slide to move said slide forwardly. At this time, the multiplier-carriage 261 occupies its normal position, toward the right-hand side of the machine, as shown in Figures 14 and 16, with the upstanding arms 232 of the multiplier slides 226 also in their right-hand positions, shown in dotted lines in Figure 19, opposite the units shoulders 247 of the product-plates 204. The operating handle 101 is now operated. The first actuation of said handle moves cross-bar 227 of the general operator forwardly, but, before said bar reaches and engages the shoulder 231 of the multiplier slide 226, the multiplier-carriage 261 is shifted to its left-hand position, shown in Figure 5, so that the arms 232 of the multiplier slides are opposite the tens partial product shoulders 246, indicated in full lines in Figure 19.

As the general operator continues in its forward movement, the bar 227 engages shoulder 231 of the mutiplier slide 226 associated with the "9" multiplier key, which is the right-hand one of the set of such slides, to move said slide forwardly. Any slide 226 will, when moved forward, actuate all of the product-plates 204, except when the partial products contain zeros (0's). If 1 is multiplied by any digit from "1" to "9", inclusive, there are no partial tens products, and no product-plate is operated during the first actuation of the general operator. If 5 is multiplied by 4, there is no units partial product and no product-plate is operated during the second actuation of the general operator. Whether the product-plates are operated or not they are not effective to move any of the multiplicand slides that have no indexing pins 168 depressed, because, in the latter case the fingers 205 of the product-plates move idly beneath the lips 203 of the indexing pins 168, as shown in Figures 2 and 16.

The number 7324 when multiplied by 9 gives the following partial products:

```
      63
      27
      18
      36
   ─────
   65916
``` of which 6213 is the total tens partial product and 3786 the total units partial product. It will be noted that it requires five register wheels to indicate the total product, and that the tens partial product begins in the tens of thousands denominational position and ends in the tens denominational position, and that the units partial product begins in the thousands denominational position and ends in the units denominational position of the register.

When the multiplier slides move forwardly, their arms 232 encounter the tens shoulders 246 of the product-plates and move the latter various distances according to the location of said shoulders on the product-plates. The "7" "3" "2" and "4" pins 168, representing the multiplicand 7324, are set on multiplicand slides 167 of thousands, hundreds, tens and units denominational order, respectively. The register is moved one step to the right, so that the units wheel is out of range of the slides 167. As the general operator moves forward, the effective multiplier slide engages the tens shoulders of all the product-plates and moves said plates forward, but only the "7" "3" "2" and "4" product-plates are effective on their associated indexing pins 168 that have previously been set, the product-plates being thus effective to drive the multiplicand slides 167 forward. Pin "7" is moved forward six steps or unitary movements, and its slide 167, through rack 207, moves the register-wheel in the tens of thousands denominational position six steps to exhibit 6 at the sight-opening 360. The "3" product-plate moves the "3" indexing pin and its associated multiplicand slide 167 forward two steps and causes the register-wheel in the thousands denominational position to rotate the same amount to exhibit 2 at the sight-opening. The "2" product-plate and the "4" product-plate similarly actuate their associated pins and slides one and three steps, respectively, to cause the hundreds wheel to exhibit 1 and the tens wheel to exhibit 3 at the sight-opening. At the end of the first actuation of the general operator, the first five wheels from the right of the machine will exhibit 62130, this being the tens partial product. As the tens-carrying mechanism has not yet been brought into action, the register shows said amount when the general operator reaches its home position, and it is necessary to actuate the handle 101 a second time to run the units partial product into the register.

At the beginning of the second operation of the handle 101, the multiplier-carriage is shifted back to its normal righthand position, whereby the arm 232 of the effective multiplier slide 226 is positioned opposite the units shoulders 247 before cross-bar 227 of the general operator engages shoulder 231 of said slide. It will be remembered that the effective slide 226 is still in its lowermost or effective position, due to the locking mechanism which holds the intermediate lever 222 in its actuated position, from which position said lever cannot return until the general operator completes its second return movement, as hereinbefore described. Simultaneously with the shifting of the multiplier-carriage, the product-register is also shifted a step to the left, as previously described, thus rendering the four dial-wheels at the right of the register effective with the multiplicand slides 167, so that said dial-wheels may be actuated when said multiplicand slides are moved forward. As the cross-bar 227 advances, arm 232 on slide 226 is advanced and engages the units shoulders 247 on the various product-plates, the product-plates being so located that the "7" products-plate drives pin 168 on the slide 167 of thousands denominational order three steps, said wheel having already accumulated a tens partial product of 2. The "3" product-plate has its units shoulder so located that it drives the "3" indexing pin 168 and the slide 167 of hundreds denominational order seven steps and the corresponding register-wheel seven steps, said wheel having already accumulated a tens partial product of 1. Similarly the "2" and the "4" product-plates drive slides 167 of tens and units denominational order, respectively, through eight and six steps, respectively, the dial-wheel of tens denominational order having accumulated a tens partial product of 3 and the units wheel having accumulated nothing.

It has now been shown how the register-wheels at the first complete actuation of the general operator indicate the tens partial product of 62130
and the units partial product  3786
total product 65916

When the units partial product 8 was accumulated on the dial-wheel of tens denominational order, said wheel passed through zero, thereby initiating a tens carry-over to the dial-wheel of next higher order, this being done in the same manner as tens-carrying in the adding registers.

At the end of the second return movement of the general operator, the intermediate lever 222 is automatically released, as hereinbefore described, together with the actuated multiplier key, and restored by spring 219ª under the multiplier key-lever 220, whereby the rear end of the multiplier slide 226 is raised out of the path of the cross-bar 227 and is thus restored to its normal or ineffective position.

The total product may now be typed in a column which may be at the right-hand side of the work-sheet and accumulated in an adding register, whereby a series of product totals may be accumulated to thus show a grand total.

As a further explanation of the operation, when the multiplier employs a plurality of digits, the same multiplicand 7324 will be employed, and the multiplier will consist of three digits 624. It being assumed that the product-register is set to "0" and positioned at the extreme left hand where all the dial-wheels 208 are exposed at the sight-opening 360, the register-shifting handle 403 is shifted rightwardly three denominational stepped positions to the positions shown in Figure 3, because the multiplier is composed of three digits. The pin set-up values of the multiplicand may be registered denominationally on the multiplicand slides 167, by the manipulation of the numeral typewriter keys, to simultaneously type the multiplicand, or by the manipulation of the multiplicand keys 150. The highest digit of the multiplier being "6", the "6" multiplier key 151 is depressed to drop its associated multiplier slide 226 into co-operative relation with the general operator 228, and the first actuation of the general operator runs the tens partial product 4112000 into the product-register, and the second actuation of the general operator runs the units partial product 282400 into the register, said register exposing a total product of 4394400. During the return stroke of the second actuation of the general operator, the product-register is automatically shifted one denominational step to the left hand, and the multiplicand and the product slides are restored to normal positions with the multiplicand indexing pins still set up for a multiplicand value of 7324. The "2" multiplier key 151 is now depressed and the double actuation of the general operator first runs the tens partial product of 100000 into the product-register to be followed by the units partial product of 46480. The product-register now exposes the total of 4540880. The multiplier and multiplicand slides have been restored to their normal positions, and the product-register has been shifted leftwardly one step which places the register at its normal position where the whole series of dials are exposed at the opening 360. The last and lowest digit of the multiplier is "4", and when the "4" multiplier key is depressed the multiplier devices are conditioned to give a tens partial product of 21010, and the units partial product of 8286, and by the double actuation of the general operator these two products are run into the product-register, which gives a final product of the computation, as 4570176. These several computations may be itemized as follows:

| | |
|---|---:|
| First tens partial product with 600 for the multiplier | 4112000 |
| First units partial product | 282400 |
| First total product | 4394400 |
| Second tens partial product with 20 for the multiplier | 100000 |
| Second units partial product | 46480 |
| Second total product | 4540880 |
| Third tens partial product with 4 for the multiplier | 21010 |
| Third units partial product | 8286 |
| Grand final product | 4570176 |
| Product-register reads | 00004570176 |

The product-register is positioned at its normal position with all the dials exposed, and the "0" setting handle 153 may be actuated to restore the dials to "0" and simultaneously clear the multiplicand slides by restoring all the depressed or set index-pins to their normal or inoperative positions, which operation conditions the machine for a new multiplying operation. It will be understood that if the multiplier had been 62.4, 6.24 or .624, the operation of multiplying the multiplicand by any of these decimal multipliers would be the same, and the proper placing of the decimal point from a reading of the dial-wheels would be determined by the operator before the decimal product was typed and run into the totalizer of the computing machine.

It is thought that a further explanation of the action of the product-plates on slides 167 may be helpful. If the indexing pins 168, representing "1", were set on all of the slides 167 and any one of the multiplier keys operated, all the product-plates might be operated by the slide 226 associated with the actuated multiplier key, but only the "1" product-plate would be effective to move the slides 167 by the fingers 205 contacting with lips 203 on the set indexing pins, according to the value of the tens and units partial product shoulders 246 and 247. In other words, all of the slides 167 would be moved exactly the same distance by the "1" product-plate. All of the other product-plates would move without being effective on any slide 167, because their fingers 205 would not encounter any of the lips 203 of the indexing pins 168 but would move beneath their associated lips. With the "1" pins set on all of the multiplicand slides 167, the distance said slides are moved by a multiplier slide 226 depends on which multiplier key is operated. There is no tens partial product when 1 is multiplied by any other digit, hence the multiplier slides 226 associated with the various multiplier keys never encounter any tens partial product shoulders 246 on the "1" product-plate, because said shoulders on said plate are cut so deep that they are beyond the range of movement of slides 226 (Figure 19), but the units partial product shoulders 247 are progressively longer, the shoulder for the "1" multiplier slide being shortest, and the shoulder for the "9" multiplier slide being longest. The arrangement of the units partial product shoulders on the "9" product-plate is the reverse of that on the "1" product-plate (Figure 27), but said product-plate is also provided with tens partial product shoulders 246, because when 9 is multiplied by any digit except 1 it produces both tens and units partial products. The product shoulders on the product-plates from "2" to "8", inclusive, are arranged in the usual manner. The product-plate which shall be effective to move a multiplicand slide 167 depends upon which pin 168 is set on the multiplicand slide. Thus, it will be understood that all the product-plates are controlled by any one of the multiplier keys, but effective only on its own associated transverse row of indexing pins 168.

The special multiplicand keys 150 may be used to set up a multiplicand in cases where the multiplicand is not to be typed, which frequently happens in making out bills and invoices.

It is sometimes desirable to type the products in a total column of the work-sheet and add them into a grand totalizer. For this purpose either one of the two adding registers in the adding section may be used and thus accumulate a series of products to give the grand total. The denomination-selector for the grand total register is set on the typewriter carriage according to the location of the grand total column on the work-sheet in the usual manner. The typewriter carriage may then be located in the proper denominational position of such column for each product to be copied from the product register. The product is typed and thereafter run into the grand total register. This operation is repeated each time a product is copied from the product register. Thus the various products as they are typed on the work-sheet are also accumulated in the grand totalizer.

It will be understood that the construction of the multiplying section herein disclosed is comparatively simple, and that it may be applied to any Underwood bookkeeping machine without materially altering said machine.

Variations may be resorted to within the scope of the invention, and portions of the improvements may be used without others.

Having thus described my invention, I claim:

1. In a computing machine, the combination of a series of pin-frames, a set of settable indexing pins on each pin-frame, said indexing pins having values from "1" to "9", key-operated means to selectively set said indexing pins, operable slides, and a series of connecing product plates, each plate to engage the indexing pins of equal value, said product plates to be collectively driven by said slides and to engage the set indexing pins to drive said pin-frames, said product plates having elements to determine the extent of movement of said pin-frames.

2. In a computing machine, the combination of a series of multiplicand devices, including a set of nine indexing elements on each multiplicand device, the indexing elements of each set having values from "1" to "9", key-operated means to selectively set said indexing elements, operable multiplier devices, a series of product plates, each product plate to directly engage the key-set indexing elements, said product plates to be collectively driven by any one of said multiplier devices, complementary shoulders on said product plates, said complementary shoulders representing tens and units partial products, said multiplier devices being operable, one at a time, and each, when effective, being actuable twice, the effective multiplier device engaging, during its first actuation, with the tens partial product shoulders, and means to shift the multiplier devices so that the effective one, on its second actuation, may engage the units partial product shoulders.

3. In a computing machine, the combination of multiplicand devices including indexing means comprising a set of pin-frames and a set of indexing pins on each pin-frame, said indexing pins having values from "1" to "9", key-operated means to selectively set said indexing pins, operable multiplier slides, a series of product plates, each product plate to directly cooperate with the set-up indexing pins of equal value, said product plates to be collectively driven by any one of said multiplier slides, complementary shoulders on said product plates, said complementary shoulders representing tens and units partial products, said multiplier slides being operable, one at a time, and each, when effective, being actuable twice, the effective multiplier slide engaging, during its first actuation, with the tens partial product shoulders, a support for said multiplier slides, and means to shift said support to bring the effective multiplier slide to a position where it may, upon its second actuation, engage the units partial product shoulders.

4. In a computing machine, the combination of a series of multiplicand devices, each device including nine individually settable indexing pins, numeral-keys operative to selectively set an indexing pin on a predetermined multiplicand device, an actuable multiplier device, and intermediate product devices to directly engage the set indexing pin of each multiplicand device, said multiplier device being effective to actuate the product devices, the latter being effective to actuate the set multiplicand devices.

5. In a computing machine, the combination of a series of multiplicand-devices, a row of indexing elements arranged longitudinally on each multiplicand-device, the elements of each row having values from 1 to 9, the elements of equal values on the various multiplicand-devices forming rows extending transversely of said multiplicand-devices, lips extending laterally from the indexing elements, the lips on the elements of each transverse row being disposed in the same plane, the transverse rows of lips being disposed in stepped relation, intermediate product devices, one for each transverse row of lips, each product device having fingers extending between adjoining multiplicand-devices and to engage said lips, said lips being normally out of effective relation with said fingers, means to selectively set said indexing elements to bring the lips thereon into effective relation with said fingers, and means to actuate said product devices to cause said fingers to engage the lips of the indexed elements to drive the associated multiplicand-devices.

6. In a computing machine, the combination of a series of multiplicand-devices, indexing elements on said multiplicand-devices, lips extending laterally from the indexing elements, intermediate product devices, each product device having engaging portions, the engaging portions of the various product devices being arranged in stepped relation, said lips being normally out of effective relation with said engaging portions, means to selectively set said indexing elements to bring the lips thereon into effective relation with said engaging portions, and means to actuate said product devices to cause said engaging portions to engage the lips of the indexed elements to drive the associated multiplicand devices.

7. In a computing machine, the combination of a series of multiplicand-devices, a row of indexing elements arranged longitudinally on each multiplicand-device, the elements of each row having values from 1 to 9, the elements of equal values on the various multiplicand-devices forming rows extending transversely of said multiplicand-devices, lips extending laterally from the indexing elements, the lips on the elements of equal values being disposed in the same plane, the transverse rows of lips being disposed in stepped relation, product-devices, one for each transverse row of lips, each product-device having fingers extending between said multiplicand devices and to engage said lips, said lips being normally out of effective relation with said fingers, means to selectively set said indexing elements to bring the lips thereon into effective relation with said fingers, multiplier devices having values from 1 to 9, and an actuator with which any one of the multiplier devices may be connected, the actuator being effective through the connected multiplier device to actuate the product-devices, so that the fingers may engage the lips of the indexed elements and drive the associated multiplicand devices.

8. In a computing machine, the combination of a series of multiplicand-devices, a row of indexing elements associated with and arranged longitudinally of each multiplicand-device, the elements of each row having values from 1 to 9, the elements of equal values associated with the various multiplicand devices forming rows extending transversely of said multiplicand devices, lips extending laterally from the indexing elements, the lips on the elements of equal values being disposed in the same plane, the transverse rows of lips being disposed in stepped relation, product-devices, one for each transverse row of lips, each product-device having fingers extending between said longitudinal rows of indexing elements to engage said lips, said lips being normally out of effective relation with said fingers, means to selectively set said indexing elements to bring the lips thereon into effective relation with said fingers, multiplier devices having values from 1 to 9, an actuator with which any one of the multiplier devices may be connected, the actuator being effective through the connected multiplier device to actuate the product-devices, so that the fingers may engage the lips of the indexed elements and drive the associated multiplicand-devices, said product-devices also having tens and units complementary shoulders, the effective multiplier device being actuated twice for each complete computation and engaging first the tens shoulders, and means to shift said multiplier devices so that the effective multiplier device may, on its second actuation, engage the units shoulders of the product-devices.

9. Computing mechanism including a series of multiplicand devices, each device having a set of indexing elements thereon, engaging lips on said indexing elements, the lips of the various indexing elements of each set being arranged in stepped relation, co-operative transmitting product devices, and means to selectively set said indexing elements to bring the lips thereon into effective relation with said transmitting devices so that the multiplicand-devices may be driven thereby.

10. Computing mechanism including a series of multiplicand-slides, each slide having a set of indexing pins thereon, laterally-extending lips on said indexing pins, the lips of the various indexing pins being arranged in stepped relation, co-operative transmitting product devices having engaging portions arranged in stepped relation corresponding with the stepped relation of the lips, and means to selectively set said indexing pins to bring the lips thereon into effective relation with said engaging portions of the transmitting devices so that the multiplicand-slides may be driven thereby.

11. Computing mechanism including a series of multiplicand-slides, a series of transmitting product plates, fingers on said product plates, said slides including frames extending between said fingers, and indexing elements on said frames, said indexing elements to be engaged by said fingers to drive said multiplicand-slides.

12. Computing mechanism including a series of multiplicand-slides, a series of transmitting product plates arranged transversely of said slides, frames extending downwardly from said multiplicand-slides and through said product plates, indexing elements from 1 to 9 on said frames, and fingers on said product plates, said fingers extending between said frames to engage said indexing elements to drive said multiplicand-slides.

13. Computing mechanism including a series of multiplicand-slides, each multiplicand-slide having a frame extending therefrom, a set of indexing elements from 1 to 9 on each frame, a set of transmitting product devices associated with the indexing elements, said indexing elements having lateral extensions projecting through said frames, said extensions being arranged in step-like form, said indexing elements being settable to bring the extensions into the paths of their associated product devices, and a brace on each multiplicand-slide to re-enforce the indexing elements when they are engaged by the product devices to actuate said multiplicand-slides.

14. Computing mechanism including a series of multiplicand-slides each multiplicand-slide having a frame extending therefrom, a set of indexing pins from 1 to 9 on each frame, a set of transmitting product devices associated with the indexing pins, lips projecting from said pins through each frame, said lips being arranged in step-like form, said pins being settable to bring the lips into the paths of their associated product devices, guides at both sides of each frame for the indexing pins, and a brace extending diagonally across each frame to re-enforce the indexing pins when they are engaged by the product devices to actuate said multiplicand-slides, each brace having slots therein through which said lips extend.

15. Computing mechanism including a series of multiplicand-slides, a series of product plates, fingers on said product-plates, said slides including frames extending between said fingers, a series of indexing elements on each frame from 1 to 9, keys to index said elements, said indexed elements to be engaged by said fingers to drive said multiplicand-slides, and side-supporting means to guide said plates to keep the fingers in proper sliding engaging relation with said indexed elements.

16. Computing mechanism including a series of multiplicand-slides, a series of transmitting product plates arranged transversely of said slides, frames extending downwardly from said slides and through said product plates, settable indexing pins on said frames, fingers on said product plates, said fingers extending between said frames to engage the set indexing pins to drive said multiplicand-slides, means to guide said multiplicand-slides, and means to guide said product plates to keep said fingers in engaging relation with said indexing pins.

17. Computing mechanism including a series of multiplicand-slides, each slide having a frame extending therefrom, a set of indexing pins from 1 to 9 on each frame, a set of transmitting product devices associated with the indexing pins, said indexing pins having lateral extensions, said product devices having fingers extending between said frames, said pins being settable to bring the extensions into the paths of the fingers of the associated product devices, and guiding means to maintain the proper engaging relation between the fingers and the lateral extensions of the indexing pins.

18. In a computing machine, the combination of a series of multiplicand slides, a series of multiplier devices, a series of product devices, each multiplicand slide including nine indexing elements suitable to and directly co-operative with said product devices, so that said slides may be directly driven by said product devices, tens and units complementary elements on said product devices, said multiplier devices being effective to engage said complementary elements to actuate said product devices, and means to cause the multiplier devices to engage alternately the tens and units complementary elements.

19. In a computing machine, the combination of a series of multiplicand devices, a series of settable indexing devices on each multiplicand device, a series of multiplier devices, a series of product devices, tens and units complementary elements on said product devices to be engaged by the multiplier devices to drive the latter, a carriage to support said multiplier devices, and means to shift said carriage to bring the multiplier devices alternately into co-operative relation with the tens and units complementary elements.

20. In a computing machine comprising settable multiplicand devices, multiplier devices actuable one at a time, and intermediate devices, each intermediate device being composed of a slide, each slide having fingers extending between said multiplicand devices to engage the latter, and each slide having product elements thereon to be engaged by the multiplier devices.

21. In a computing machine comprising vertically-disposed multiplicand devices, indexing elements thereon, vertically-disposed multiplier devices actuable one at a time, each multiplier device having an upwardly-extending finger, and horizontally-disposed intermediate devices extending crosswise of said multiplicand devices and said multiplier devices, each intermediate device being composed of a slide, each slide having fingers extending forwardly between said multiplicand devices to engage the latter, and each slide having product elements thereon to be engaged by the upwardly-extending fingers on said multiplier devices.

22. Computing mechanism comprising a set of slides, a set of actuating bars for said slides, said actuating bars being L-shaped to form two sets of arms, a reciprocable general operator, the arms of one set being horizontally disposed under the set of slides, so that they may be individually released to drop into engagement with the general operator, the other set of arms extending vertically through the slides to engage and drive the latter parallel to the general operator, and means to release said actuating bars one at a time into engagement with said general operator.

23. Computing mechanism comprising a set of product plates, a set of multiplier bars for said product plates, said multiplier bars being L-shaped to form two sets of arms, one set of arms being arranged outside of the set of product plates, the other set of arms extending through the product plates to engage and drive the latter, multiplicand devices extending through said product plates and actuable by the latter, and totalizing mechanism actuable by said multiplicand devices.

24. Computing mechanism comprising a set of product plates, a set of multiplier bars for said product plates, said multiplier bars being L-shaped to form two sets of arms, a general operator, one set of arms being arranged beneath the set of product plates to be engaged by said general operator, the other set of arms extending upwardly through the product plates to engage and drive the latter, multiplicand devices arranged above the set of product plates, extensions projecting downwardly from said multiplicand devices and through said product plates, said extensions to be selectively engaged by said product plates to actuate said multiplicand devices, and totalizing mechanism actuable by said multiplicand devices.

25. Computing mechanism comprising multiplier devices, product devices, and a general operator having a cross-bar and standards thereon, said cross-bar being effective to drive the product devices through the medium of any one of the multiplier devices, the standards being effective to restore all of the product devices.

26. Computing mechanism comprising multiplier devices, product devices, shoulders on said product devices, a general operator, the general operator comprising a cross-bar to drive the product devices through the medium of any one of the multiplier devices, and standards on said cross-bar to engage the shoulders to restore all of the product devices.

27. Computing mechanism including multiplicand slides, multiplier-devices, product devices, and a general operator, the general operator comprising two cross-bars, one of said cross-bars to engage said multiplier-devices to drive said multiplicand slides, the other cross-bar to engage means on the multiplicand slides to restore them to normal.

28. Computing mechanism comprising multiplicand devices, multiplier devices, product devices, and a general operator, the general operator comprising a cross-bar and a frame, said cross-bar being effective to engage any one of the multiplier devices to thereby drive the product devices and the multiplicand devices, the frame being effective to restore the product devices and the multiplicand devices.

29. In a computing machine, the combination of a set of denominationally-arranged multiplicand devices, a set of indexing elements on each multiplicand device, the indexing elements of each set having values from "1" to "9", numeral-keys, setting-bars operable by said numeral-keys, denominational selecting devices, each having a set of interponents to be moved into registration with the setting-bars and a set of indexing elements, so that the operated numeral-key may set the indexing elements of corresponding value through the medium of the associated setting-bar, multiplier devices, and series of connecting product devices, said product devices being collectively driven by any one of the multiplier devices to engage the set indexing elements to drive the multiplicand devices, said product devices having elements to determine the extent of movement of said multiplicand devices.

30. In a computing machine, the combination of a set of denominationally-arranged multiplicand devices, a set of indexing pins on each multiplicand device, the indexing pins of each set having values from "1" to "9", the pins of equal value of the various sets forming transverse rows, a set of key-operated pin-setting bars, one bar disposed above each transverse row of pins, a carriage, denomination-selecting bars operable by said carriage, each denomination-selecting bar having a set of interponents to be moved into register with the setting-bars and the indexing pins so that any one of the pins of the selected denomination may be set by the corresponding setting-bar, actuable multiplier devices, intermediate product devices to be actuated by said multiplier devices and to engage the set indexing pins to drive said multiplicand devices, and product registering means actuable by said multiplicand devices.

31. In a computing machine, the combination of a set of denominationally-arranged multiplicand devices, a set of indexing pins on each multiplicand device, the indexing pins of each set having values from "1" to "9", the pins of equal value of the various sets forming transverse rows, a set of key-operated pin-setting bars, one bar disposed above each transverse row of pins, a carriage, denomination-selecting bars operable by said carriage, each denomination-selecting bar having a set of interponents to be moved into register with the setting-bars and the indexing pins, so that any one of the pins of the selected denomination may be set by the corresponding setting bar, actuable multiplier devices, intermediate product devices, said product devices having elements to be engaged by said multiplier devices, said product devices having fingers to engage said indexing pins to drive said multiplicand devices, dial-wheels, and racks to drive said dial-wheels, said racks being operable by said multiplicand devices.

32. In a computing machine, the combination with a set of denominationally-arranged multiplicand devices, a set of indexing pins on each multiplicand device, and having values from 1 to 9, the pins of equal value of the sets forming transverse rows, a set of key-operated pin-setting bars, one bar disposed above each transverse row of pins, and a carriage, of denomination-selecting bars operable by said carriage, each denomination-selecting bar having a set of interponents to be moved into register with the setting-bars and the indexing pins, so that any one of the pins of the selected denomination may be set, actuable multiplier devices, product-plates having fingers and tens and units complementary product elements, each mutliplier device being effective to engage said product elements to drive said fingers to engage the set-up indexing pins to drive the multiplicand devices, said multiplier devices being operable twice for each multiplying operation of a single digit and effective to engage first with the tens product elements, means to shift the multiplier devices so that they may on their second actuation engage with the units product elements, dial-wheels, racks to drive said dial-wheels, said racks to be driven by said multiplicand devices, a carriage to support said dial-wheels and said racks, and means to shift said last-named carriage for each complete multiplying operation by a single digit, to carry the racks into co-operative relation with the multiplicand devices of the next lower denominational order.

33. In a computing machine, the combination of mutiplier devices, one for each digit from "1" to "9", inclusive, product devices, each product device having tens and units complementary shoulders, reciprocable means to cause all the multiplier devices to shift between two operative positions, a first position to engage the tens shoulders and a second position to engage the units shoulders, means to actuate any one of said multiplier devices to drive the product devices, product-registering means, and means operable by said product devices to actuate the registering means.

34. In a computing machine, the combination of numeral-keys from "1" to "9", inclusive, a general operator, multiplier devices, one associated with each numeral-key and settable thereby into engagement with the general operator, product devices, each product having tens and units complementary shoulders, the general operator being operable twice for each complete multiplying operation by a single digit, means to cause each set multiplier device to engage on the first actuation of the general operator with the tens shoulders, and on the second operation with the units shoulders, product-registering means, and means operable by said product devices to actuate said registering means.

35. In a computing machine, the combination of multiplier devices, one for each digit from "1" to "9", inclusive, product devices, each product device having tens and units complementary shoulders, a carriage to support said multiplier devices, means to actuate said carriage to cause said multiplier devices to engage first the tens shoulders and then the units shoulders, means to actuate any one of said multiplier devices to drive the product devices, product-registering means, and multiplicand means to operate the registering means.

36. In a computing machine, the combination of numeral-keys from "1" to "9", inclusive, a general operator, multiplier devices, one associated with each numeral-key and settable thereby into engagement with the general operator, product devices, each product device having tens and units complementary shoulders, the general operator being operable twice for each complete multiplying operation by a single digit, a carriage to support said multiplier devices, means actuable by the general operator to reciprocate said carriage to cause each set multiplier device to engage on the first actuation of the general operator with the tens shoulders, and on the second operation with the units shoulders, product-registering means, and multiplicand means to operate the registering means.

37. In a computing machine, the combination of multiplier devices, one for each digit from "1" to "9", inclusive, product devices, each product device having tens and units complementary shoulders, a carriage to support the multiplier devices, a cam, a lever operable by said cam to reciprocate said carriage to cause said multiplier devices to register first with tens shoulders and then with the units shoulders, means to actuate any one of said multiplier devices to drive the product devices, product-registering means, and multiplicand means to operate the registering means.

38. In a computing machine, the combination of numeral-keys from "1" to "9", inclusive, a general operator, multiplier devices, one associated with each numeral-key and settable thereby into engagement with the general operator, product devices, each product device having tens and units complementary shoulders, the general operator being operable twice for each complete multiplying operation by a single digit, a carriage to support said multiplier devices, a shaft, clutch-means operable by said keys to connect said shaft with the general operator, a cam on said shaft, a lever operable by said cam to reciprocate said carriage to cause each set multiplier device to engage on the first actuation of the general operator with the tens shoulders, and on the second operation with the units shoulders, product-registering means, and multiplicand means to operate said registering means.

39. In a computing machine, the combination of numeral-keys from "1" to "9", inclusive, a general operator, multiplier slides. one associated with each numeral-key and settable thereby into engagement with the general operator to be driven by the latter, product plates, each product plate having tens and units complementary shoulders, the general operator being operable twice for each complete multiplying operation of a single digit, a carriage to support said multiplier slides, a frame to guide said product plates, said carriage being supported and guided on said frame, a shaft, means operable by said keys to connect said shaft with the general operator, a cam on said shaft, a pawl-and-ratchet connection between said shaft and said cam, a lever operable by said cam to reciprocate said carriage to position the multiplier slides that they may be on the first actuation of the general operator in co-operative relation with the tens shoulders, and on the second actuation of the general operator in co-operative relation with the units shoulders, a register, settable multiplicand devices operable by said product plates, and means operable by said multiplicand devices to actuate said register.

40. In a multiplying machine, the combination of a set of multiplicand devices, a set of product devices to cooperate with said multiplicand devices, a set of multiplier devices to co-operate with said product devices, fixed guiding means for the multiplicand devices and the product devices, guiding means for said multiplier devices, said last-named guiding means comprising a carriage, tens and units complementary elements on the product devices, and means to reciprocate said carriage during each complete multiplying actuation by a single digit to carry the multiplier devices into co-operative relation with the tens and units complementary elements of the product devices.

41. In a multiplying machine, the combination of a set of multiplicand devices, a set of indexing devices on each multiplicand device, a set of operable product devices, the latter having fingers to engage said indexing devices, complementary tens and units shoulders on the product devices, a set of multiplier devices to engage said shoulders to actuate said product devices, fixed guiding means for said multiplicand devices and said product devices to insure proper engagement of the fingers with said indexing devices, guiding means for the multiplier devices to insure engagement of the latter with said shoulders, said last-named guiding means comprising a carriage, and means to reciprocate said carriage to carry said multiplier devices from co-operative relation with the tens shoulders to co-operative relation with the units shoulders, and vice versa.

42. In a multiplying machine, the combination of a set of multiplicand devices, a set of product devices to co-operate with said multiplicand devices, each product device having tens and units complementary shoulders, a set of multiplier devices to co-operate with the shoulders of said product devices, once for tens partial products and once for units partial products for each complete multiplying operation by a single digit, brackets to guide said product devices, means to guide the multiplicand devices, a reciprocating carriage for said multiplier devices, said carriage being supported on said brackets, a general operator to actuate said multiplier devices, means on said carriage to guide said multiplier devices during their actuation, and means connected with said carriage and operable by the general operator to reciprocate said carriage to change the co-operative relation between the multiplier devices and the product devices for the tens and units partial products.

43. In a multiplying machine, the combination of a set of multiplicand devices, a set of multiplier devices, a general operator to drive the multiplier devices, intermediate product devices having tens and units complementary shoulders engageable by the multiplier devices to drive the multiplicand devices, said multiplier devices being operable by the general operator twice for each complete multiplying operation, once against the tens shoulders and once against the units shoulders, and means to shift said multiplier devices with respect to said shoulders of the product devices from theirs tens partial product positions to their units partial product positions, and vice versa.

44. In a computing machine, the combination of multiplier devices, a general operator, key-operated means to set any one of the multiplier devices in co-operative relation with said general operator, product devices, each product device having tens and units complementary shoulders, the effective multiplier device being actuable by the general operator twice for each complete multiplying operation by a single digit, means to cause said multiplier devices when effective to engage on their first actuation with the tens shoulders and on their second actuation with the units shoulders, locking means to hold the key-operated means in operated position to retain the effective multiplier device in co-operative relation with the general operator, and means operable by the general operator on its second actuation to actuate the locking means to release the key-operated means and allow the effective multiplier device to be restored to normal.

45. In a computing machine, the combination of multiplier devices, a general operator, keys to set any one of the multiplier devices in co-operative relation with said general operator, product devices, each product device having tens and units complementary shoulders, the effective multiplier device being actuable by the general operator twice for each complete multiplying operation by a single digit, means to cause said multiplier devices when effective to engage on their first actuation with the tens shoulders and on their second actuation with the units shoulders, locking means effective to retain the effective multiplier device in co-operative relation with the general operator, releaser pin normally disconnected from the general operator, means operable by any one of the keys to connect said releaser pin with the general operator, so that said releaser pin may be continuously actuated by the general operator during the double actuation thereof, and means actuable by said releaser pin during the second actuation of the general operator to actuate said locking means and release the effective multiplier device to normal.

46. In a computing machine, the combination of multiplier devices, a general operator, key-connections to set any one of the multiplier devices in co-operative relation with said general operator, product devices, each product device having tens and units complementary shoulders, the effective multiplier device being actuable by the general operator twice for each complete multiplying operation by a single digit, a carriage to support said multiplier devices, means actuable by the general operator to reciprocate said carriage to position the multiplier devices so that they may engage on their first actuation with the tens shoulders and on their second actuation with the units shoulders, a locking bail to hold any actuated key-connection in operated position to retain the effective multiplier device in co-operative relation with the general operator, a releaser pin normaly disconnected from the general operator, means operable by any one of the key-connections to connect said releaser pin with the general operator during the double actuation thereof, the releaser pin being ineffective during the first actuation of the general operator and effective during the second actuation of the latter, and means actuable by said releaser pin during the second actuation of the general operator to actuate said locking bail to release the key-set multiplier device to be restored to normal.

47. In a computing machine, the combination of multiplier devices, a general operator, key-connections to set any one of the multiplier devices in co-operative relation with said general operator, product devices, each product device having tens and units complementary shoulders, the effective multiplier device being actuable by the general operator twice for each complete multiplying operation by a single digit, a carriage to support said multiplier devices, means actuable by the general operator to reciprocate said carriage to position the multiplier devices so that they may engage on their first actuation with the tens shoulders and on their second actuation with the units shoulders, a locking bail to hold an actuated key-connection in operated position to retain the effective multiplier device in co-operative relation with the general operator, a releaser pin, means to connect said releases pin with the general operator, a pawl-and-ratchet connection to said releaser pin, and a lever operable by said releaser pin on the second actuation of the general operator to actuate said locking bail to release the actuated key-connection to allow the effective multiplier device to be restored to normal.

48. In a computing machine, the combination of multiplier slides, a general operator, key-operated connections to set any one of the multiplier slides in co-operative relation with said general operator, product plates, each product plate having tens and units complementary shoulders, the effective multiplier slide being actuable by the general operator twice for each complete multiplying operation by a single digit, a carriage to support said multiplier slides, a cam operable by the general operator, a lever actuable by position the multiplier slides so that they may engage on their first actuation with the tens shoulders and upon their second actuation with the units shoulders, a locking bail co-operating with said key-operated connections to hold the actuated connection in operated position to retain the effective multiplier slide in co-operative relation with the general operator, a gear connected with the general operator, a shaft, a clutch operable by said key-operated connections to connect said shaft with said gear, a releaser pin rotatable with said shaft, a pawl-and-ratchet connection between said releaser pin and said clutch, and a lever operable by said releaser pin on the second actuation of the general operator to actuate said locking bail to release the actuated key-connection to allow the effective multiplier slide to be restored to normal.

49. In a computing machine, the combination of multiplier devices, a general operator, key-connections to set any one of the multiplier devices in co-operative relation with said general operator, product devices, each product device having tens and units complementary shoulders, the effective multiplier device being actuable by the general operator twice for each complete multiplying operation by a single digit, a carriage to support said multiplier devices, a gear driven by said general operator, means to reciprocate said carriage, and means operable by said key-connections to connect the carriage-reciprocating means with said gear so that the carriage may be moved to position the multiplier devices first with reference to the tens shoulders and then with reference to the units shoulders.

50. In a computing machine, the combination of multiplier devices, a general operator, key-connections to set any one of the multiplier devices in cooperative relation with said general operator, product devices, each product device having tens and units complementary shoulders, the effective multiplier device being actuable by the general operator twice for each complete multiplying operation by a single digit, a carriage to support said multiplier devices, a gear, a shaft, a clutch operable by said key-connections to connect said shaft with said gear, a cam on said shaft, and a lever operable by said cam to move the carriage to position the multiplier devices first with reference to the tens shoulders and then with reference to the units shoulders.

51. In a computing machine, the combination of multiplier devices, a general operator, key-connections to set any one of the multiplier devices in co-operative relation with said general operator, product devices, each product device having tens and units complementary shoulders, the effective multiplier device being actuable by the general operator twice for each complete multiplying operation by a single digit, a carriage to support said multiplier devices, a gear, a shaft, a clutch operable by said key-connections to connect said shaft with said gear, a cam on said shaft, a lever operable by said cam to move the carriage to position the multiplier devices first with reference to the tens shoulders and then with reference to the units shoulders, locking means to retain the clutch effective, and means actuable by the general operator on its second actuation to release the locking means to render the clutch ineffective, to break the connection between the general operator and the carriage.

52. In a computing machine, the combination of multiplier devices, a general operator, key-operated connections to set any one of the multiplier devices in co-operative relation with said general operator, product devices, each product device having tens and units complementary shoulders, the effective multiplier device being actuable by the general operator twice for each complete multiplying operation by a single digit, a carriage to support said multiplier devices, means to reciprocate said carriage to position said multiplier devices for their first actuation with reference to the tens shoulders and for their second actuation with reference to the units shoulders, said reciprocating means being connectible with the general operator by said key-operated connections, locking means effective to retain the effective multiplier device in co-operative relation with the general operator and to retain the reciprocating means connected with the general operator, and releasing means actuable by the general operator on its second actuation to actuate said locking means and allow the effective multiplier device to be restored to normal and the reciprocating means to become disconnected from the general operator.

53. In a multiplication machine, the combination with a set of numeral-keys, multiplicand devices, each device having indexing devices from 1 to 9 settable by the keys, a travelling carriage, denomination-selecting mechanism for the multiplicand devices operable by said carriage, carriage-feeding mechanism operable by said keys, product devices to engage the set indexing devices to actuate the multiplicand devices, a general operator, and multiplier devices, of key-released means to selectively set the multiplier devices into effective relation with the general operator, so that the set multiplier devices may be driven by said general operator, each multiplier device operable to occupy two positions so that they may compute a tens partial product in one position, and a units partial product in the other position, means actuable by the general operator to shift the multiplier devices to their two partial product positions, a register-carriage including dial-wheels and racks for said dial-wheels to be driven by the multiplicand devices, and means also actuable by the general operator to shift said register-carriage so that the dial racks of the next lower denominational order may be engageable with the same setting of the multiplicand devices.

54. In a multiplying machine, the combination of a group of multiplicand keys, multiplicand devices, each including nine indexing pins, settable by said keys, a group of multiplier keys, multiplier devices releasable by their associated multiplier keys, a reciprocable general operator to drive the released multiplier devices, intermediate product devices operable by the associated multiplier devices to drive the multiplicand devices, and product-registering mechanism operable by said multiplicand devices.

55. In a multiplying machine, the combination of a series of denominationally-arranged multiplicand-slides, a set of normally-ineffective indexing pins on each slide from 1 to 9, lateral projections on the indexing pins, a group of transverse product slides, each slide having extensions disposed between said multiplicand-slides, numeral-keys to set the indexing pins to carry the lateral projections into co-operative alignment with said extensions, a general operator, means actuable by the general operator to drive the product slides, the extensions of said product slides engaging the lateral projections of the indexed pins to drive the multiplicant slides, and dial-wheels having connections to be driven by the multiplicant slides.

56. In a computing machine, a multiplicand-slide, a set of indexing pins having values from 1 to 9, inclusive, on said slide, each pin being movable lengthwise of itself to a set position, each pin having an engaging portion extending therefrom and at right angles to the direction of its setting movement, and actuating devices, one for each pin, each device being effective to engage the associated set pin to drive the multiplicand-slide.

57. In a computing machine, the combination of multiplicand-devices each multiplicand-device including a rectangular portion, settable indexing pins on each rectangular portion, product devices to engage the set indexing pins to drive the multiplicand-devices, each rectangular portion having two triangular cutouts to form a diagonally-disposed bar, said bars to brace the indexed pins the multiplicand-devices are actuated, arms extending from the front and from the rear of the rectangular portion of each multiplicand-device, and fixed parallel guide-bars for said arms.

58. In a computing machine, the combination of multiplicand-devices, each multiplicand-device including a rectangular portion settable indexing pins on each rectangular portion, transmitting product devices to engage the set indexing pins to drive the multiplicand-devices, each rectangular portion having two triangular cutouts to form a diagonally-disposed bar, said bars being effective to brace the indexed pins when the multiplicand-devices are actuated, arms extending from the front and from the rear of the rectangular portion of each multiplicand-device, fixed guide-bars for said arms, a fixed frame, and standards on said frame to guide said product devices and hold their alignment with the indexed pins.

59. In a computing machine, the combination of multiplicand devices, each multiplicand device comprising a rectangular portion, settable indexing pins on each rectangular portion, product devices to engage the set indexing pins to drive the multiplicand devices, each rectangular portion having two triangular cutouts to form a diagonally-disposed bar, said bars to brace the indexing pins when the multiplicand devices are actuated, arms extending from the front and from the rear of the rectangular portion of each multiplicand device, fixed guide-bars for said arms, a fixed frame, standards on said frame to guide said product devices to cause them to properly engage the indexing pins, multiplier devices to actuate the product devices, a shiftable frame to support the multiplier devices to change their relation with respect to the product devices, said shiftable frame comprising two bars, and a plate to guide said multiplier devices in their movements on the shiftable frame.

60. In a computing machine, the combination of a general operator, multiplier devices, key-operated releasing connections to release said multiplier devices into the path of said general operator, each connection comprising an intermediate device, a holding device common to all the intermediate devices, and means actuable by the general operator effective to force said holding device to release any actuated intermediate device.

61. In a computing machine, the combination of multiplicand slides, each slide comprising a rectangular portion, settable indexing pins on each rectangular portion, lips on said indexing pins, product plates to engage the set indexing pins to drive the multiplicand slides, each rectangular portion having a diagonally-disposed bar, said bars having slots through which said lips extend, said slots serving to limit the movements of the indexing pins on the multiplicand slides, said diagonally-disposed bars being effective to brace the indexing pins when the multiplicand slides are actuated, and means to guide said multiplicand slides.

62. In a multiplying machine, the combination of a series of multiplicand-slides, each slide having depressible pins for indexing values 1 to 9, key-operated means to selectively index any pin on any multiplicand-slide, a series of nine multiplier-slides, and a series of nine product-plates intermediate the multiplier-slides and the multiplicand-slides, each multiplier-slide having means to drive the series of product-plates and each product-plate having driving means to engage a key-indexed pin to drive its multiplicand-slide.

63. In a multiplying machine having a carriage, including dials, and dial-driving members, the combination of a series of multiplicand-slides, each slide having nine indexing elements from 1 to 9, a single set of keys, from 1 to 9, operative to set said indexing elements, a set of product-devices, a series of multiplier-elements, each product-device engageable by a multiplier-element and engaging the set indexed elements of the multiplicand-mechanism, a general operator, and key-actuated means operative to present a multiplier-element to the general operator, each multiplier-element including a means to be engaged by the general operator and an L-section engageable with all the product-devices, to drive the pin-set multiplicand-slides to drive the dial-driving members on the carriage.

64. In a multiplying machine having a carriage, including dials, and dial-driving members, the combination of a multiplicand-mechanism including a series of multiplicand-slides, indexing elements on each slide, keys to selectively set the indexing elements, a series of product-plates, and an actuable multiplier-element to directly drive the product-plates, each product-plate having means effective to directly engage the key-indexed elements, to drive their multiplicand-slides, to drive the dial-driving members on the carriage.

65. In a multiplying machine having a carriage, including dials, and dial-driving members, the combination of a multiplicand-mechanism including a series of multiplicand-slides, indexing elements on each slide, keys to selectively set the indexing elements, a series of product-elements, and an actuable multiplier-element, each product-element having product-shoulders, and having multiplicand-slide-clearing slots that form fingers, said product-shoulders engageable by the multiplier-element to drive the product-elements, and each finger engageable with an indexed element to drive its multiplicand-slide, to drive a dial-driving member on the carriage.

66. In a multiplying machine having a carriage, including dials, and dial-driving members, the combination of a multiplicand-mechanism including a series of multiplicand-slides, a series of actuable multiplier-devices, one device for each digit from 1 to 9, product-plates, and means to render any one of said multiplicand-slides effective to be driven by the product-plates so that any multiplier-device may actuate said multiplicand-slides to drive the dial-driving members.

67. In a multiplying machine having a carriage, including dials, and dial-driving members, the combination of a multiplicand-mechanism including a series of multiplicand-slides, each slide having a series of indexing elements from 1 to 9, a single set of keys to selectively set said indexing elements, actuable multiplier-devices for the digits from 1 to 9, and product devices intermediate each multiplier-device and the series of multiplicand-slides, the product devices to be collectively driven by any multiplier-device to pick up any indexed element to drive its multiplicand-slide and drive a dial-driving member.

68. In a multiplying machine, the combination of a series of register devices, a set of multiplicand-slides for driving each register device, indexing elements for each multiplicand-slide settable from 1 to 9, a series of multiplier-devices from 1 to 9, a series of intermediate product devices, each product device engageable with the indexed element of equal value on each multiplicand-slide, means to set an indexing element relatively to the product devices and according to the digit of the multiplicand, a general operator, and key-actuated means to render any one of the multiplier-devices effective to be driven by the general operator to drive the product devices, the indexed multiplicand-slides and the register devices connected with this train of mechanisms.

69. In a multiplying machine, the combination of a series of denominationally-arranged register driving multiplicand-slides, a set of multiplicand-indexing elements on each slide, having values from 1 to 9, a series of multiplier-devices having values from 1 to 9, a set of product-plates arranged in numerical order from 1 to 9, each product-plate being engageable with the indexing elements of equal value on all the multiplicand-slides, key-actuated means operative to set an indexing element upon each multiplicand-slide in the path of the product-plates and according to the digit of the multiplicand, a general operator, and means to set any one of the multiplier-devices into the path of the general operator, to drive said multiplier-device to drive the product-plates and drive the set indexed elements of the register-driving multiplicand-slides.

70. In a computing machine, the combination with a multiplying mechanism including denominationally - arranged non - traveling multiplicand-driving devices, of a totalizer-carriage having dial-wheels and denominational dial-rotating racks, said racks operable by said driving devices to rotate said dial-wheels, and carriage-shifting mechanism automatically effective during the course of computing to change the denominational relation between the dial-racks and said driving devices, so that each dial-rack may interchange with the driving devices of next higher decimal order for accumulating dissimilar successive items in the totalizer for a product.

71. In a computing machine, the combination with a multiplying mechanism, including denominationally-arranged multiplicand-slides and a traveling carriage carrying a series of dial-wheels, of a series of rack-bars movable with said carriage and always in engagement to rotate the series of dials, a tongue and groove driving connection between the series of multiplicand-slides and the series of dial-rotating bars, and means operable to move the dial-driving bars laterally so as to change the denominational relation of the series of dial-bars to the denominational positions of the multiplicand-slides to promote an addition of tens and units partial products in decimal order.

72. In a computing machine, the combination with a multiplying mechanism including denominationally - arranged non - traveling multiplicand-driving devices, and a traveling carriage to support a register having dial-wheels, of denominational rack-bars on said carriage in permanent train with said dial-wheels, said rack-bars to be positively driven by said multiplicand-devices to rotate said dial-wheels in one direction, multiplier-elements, and means to shift said carriage and dial-rack-bars one decimal position relative to the multiplicand-devices at each multiplying operation by each multiplier-element to change the denominational relation between the dial-rack-bars and the multiplicand-devices, for the addition of tens and units partial products in decimal order in the register.

73. In a computing machine, the combination with a multiplying mechanism including denominationally - arranged non - traveling multiplicand-driving devices, and a traveling carriage to support a register having dial-wheels, of denominational dial-rotating rack-bars on said carriage, a tongue and groove connection between each rack-bar and a driving multiplicand-device to drive the rack-bar to rotate its dial-wheel, and means to shift the carriage and dial-rotating bars one decimal position laterally relative to the multiplicand-devices at each multiplying operation by a single multiplier, so that each multiplicand-device may drive the rack-bar of next lower denominational order for the addition of tens and units partial products in decimal order, the tongue and groove connection permitting the lateral movement between the dial-bars and the multiplicand-devices.

74. In a computing machine, the combination with a multiplying mechanism including denominationally - arranged non - traveling multiplicand-devices, a general operator to selectively actuate said multiplicand-devices according to the number of digits in the multiplicand, and a traveling carriage having registering dial-wheels, of denominational dial-rotating rack-bars on the carriage engageable with said multiplicand-devices to rotate said dial-wheels, and means rotatable with the general operator and effective to shift the carriage and dial-rotating bars to change the denominational relation between the dial-bars and said multiplicand-devices, each active multiplicand-device engaging the dial-bar of next lower denominational order, so that two dissimilar partial products may be added in correct decimal order for a final product.

75. In a computing machine, the combination with a multiplying mechanism including denominationally-arranged multiplicand-devices, a general operator to actuate said multiplicand-devices, and a traveling carriage to support registering dial-wheels, of denominational dial-rotating rack-bars mounted on said carriage and engageable with said multiplicand-devices to rotate said dial-wheels, and means operable by the general operator and effective to shift the carriage at each multiplying operation by a single multiplier, to change the denominational arrangement between all the dial-bars and said multiplicand-devices, each multiplicand-device engaging the dial-bar of next lower denominational order, and automatically adjust the two dissimilar denominational products in correct decimal order for addition.

76. In a computing machine, the combination with a multiplying mechanism including denominationally arranged multiplicand-driving devices, a general operator to actuate said multiplicand-devices, and a traveling carriage to support registering dial-wheels, of denominational dial-rotating rack-bars mounted on said carriage and engageable with said multiplicand-devices to rotate said dial-wheels, a cam actuable by said general operator and means engageable by said cam and effective to shift the carriage and dial-bars to change the denominational relation between the dial-bars and said multiplicand-devices, so that each multiplicand-device may engage a new dial-bar of next lower denominational order to promote the accumulation of a full product by the registering dial-wheels.

77. In a computing machine, the combination with a multiplying mechanism including denominationally-arranged multiplicand-driving devices, a general operator to actuate said multiplicand-devices, and a traveling carriage to support registering dial-wheels, of denominational dial-rotating rack-bars on said carriage and engageable by said multiplicand-devices to rotate said dial-wheels, teeth on said carriage, and a tooth-driving cam operable by the general operator at every other cycle thereof to shift the registering dial-wheels and the dial-bars laterally according to the number of multiplying operations by a succession of single multipliers and change the denominational relation between the dial-bars and said multiplicand-devices, so that each multiplicand-device may engage the dial-bar of next lower denominational order progressively according to the number of digits in the multiplier.

78. In a computing machine, the combination with a multiplying mechanism including denominationally-arranged multiplicand-driving devices, a general operator to actuate said multiplicand-devices, and a traveling carriage to support registering dial-wheels, of denominational dial-rotating rack-bars mounted on said carriage, a tongue and groove connection between each rack-bar and a multiplicand-device, effective to drive said rack-bars to rotate the dial-wheels, a general operator to actuate said multiplicand-devices, and a cam operable with each second cycle of said general operator to displace the registering dials and their rack-bars, a unit of distance in each complete multiplying operation by any multiplier to shift the dial-bars laterally with relation to the multiplicand-devices, each multiplicand-device engageable with a new dial-bar of next lower denomination, said tongue and groove connection being effective to permit the relative displacement of the dial-bars across the multiplicand-devices.

79. In a computing machine, the combination of dial-driving multiplicand-devices, actuating product-plates, settable indexing pin-elements on each multiplicand-device to render each device selectively effective to drive a dial, intermediate devices on said product-plates to engage and drive the indexed elements, a general operator, multiplier-slides to simultaneously drive the product-plates, and means to render the general operator effective upon any one of the multiplier-slides, so that the product-plates may selectively drive the multiplicand-devices to drive the associated dials.

80. In a computing machine, the combination of multiplicand-devices, each device having settable indexing elements 1 to 9, key-actuating means to render each multiplicand-device effective to be driven by the setting of one of its indexing elements, a dial-register, product-devices, multiplier-devices, a general operator, and key-actuated means to selectively present any one of the multiplier-devices to the general operator, to drive the product-devices directly engaging the indexed elements, to drive the associated multiplicand-devices and rotate the dials of the register.

81. In a computing machine, the combination of multiplier-keys, a general operator, multiplier-devices to be moved thereby into effective relation with said general operator, means controlled by the general operator and effective upon any one of said keys when actuated, to hold the key in actuated position throughout the multiplying operation of the general operator, said means including a rotatable device to be driven by said general operator, a releaser pin to be driven by said rotatable device, said rotatable device being normally out of engagement with said general operator, means operable by said keys to connect said rotatable device with said general operator, and means to cause said releaser pin to be effective on the last half of the multiplying operation of the general operator, to release the actuated key.

82. In a computing machine, the combination of multiplier-keys, a general operator, multiplier-devices, one for each key to be moved thereby into effective relation with said general operator, means controlled by the general operator and effective upon any one of said keys when actuated, to hold the key in actuated position throughout the multiplying operation of the general operator, said means including a releaser pin to be driven by said general operator, but normally disconnected therefrom, means operable by said keys to connect said releaser pin with said general operator, and means to cause said releaser pin to be effective only on the last half of the multiplying operation of the general operator, to release the actuated key.

83. In a computing machine, the combination of numeral-keys, a general operator, multiplier-devices, one device for each key to be moved thereby into effective relation with said general operator, means controlled by the general operator and effective upon any one of said keys when actuated, to hold the key in actuated position throughout the multiplying operation of the general operator, said means including a releaser pin to be driven by said general operator, but normally disconnected therefrom, and means operable by said keys to connect said releaser pin with said general operator, said releaser pin being effective when actuated by the general operator, to release the actuated key only during the last half of the multiplying operation thereof.

84. In a computing machine, the combination of multiplier numeral-keys, a general operator, multiplier-devices to be moved into effective relation with said general operator, means controlled by the general operator and effective upon any one of said keys when actuated to detain the key in its actuated position throughout a two cycle action of the general operator, said general operator having a rack, a gear driven by said rack, a releaser pin driven by said gear, said gear being normally out of engagement with said releaser pin, means operable by said keys to connect said gear with said releaser pin, and a pawl-andratchet device between said gear and said releaser pin means to cause said releaser to be ineffective during the first cycling action of the general operator and effective during the second cycling action of the general operator to release the actuated multiplier-key.

85. In a computing machine, the combination of multiplier-keys, a general operator, multiplier-devices to be moved into effective relation with said general operator, means controlled by the general operator and effective upon any one of said keys when actuated to detain the key in its actuated position throughout a first cycle of action of the general operator, said general operator having a rack, a gear to be driven by said rack, releasing means to be driven by said gear, a clutch, means operable by said keys to actuate said clutch to connect said gear with said releasing means, and means to cause said releasing means to be effective during the second cycling action of the general operator to render the key-detaining means ineffective and release the actuated multiplier-key.

86. In a computing machine, the combination of multiplier numeral-keys, a general operator, multiplier-devices to be actuated by said general operator, means operable by said keys to move said multiplier-devices into co-operative relation with said general operator, means controlled by the general operator and effective upon any one of said keys when actuated to detain the key in its actuated position throughout a first cycle of action of the general operator, a shaft, mechanism operable by each key to connect said shaft with the general operator, an extension on said shaft operable by a second cycle of the general operator, and a lever operable by said extension, said lever engaging the detaining means to actuate the latter to release the actuated keys.

87. In a computing machine, the combination of multiplier numeral-keys, a general operator, multiplier-devices to be actuated by said general operator, means operable by each key to move a multiplier-device into co-operative relation with said general operator, means controlled by the general operator and effective upon any one of said keys when actuated to detain the key in its actuated position throughout a two-cycle action of the general operator, a gear to be driven by the general operator, a shaft, a clutch, means operable by said keys to actuate said clutch to connect said shaft with the gear, a releaser pin driven by said shaft, a lever operable by said releaser pin, and a pawl-and-ratchet connection between said releaser pin and said clutch said lever to be operated at the second cycling action of the general operator, to actuate the key detaining means and release the actuated key.

88. In a computing machine, the combination with multiplier-devices including a general operator, key-connections to set any one of the multiplier-devices in co-operative relation with said general operator, and product-devices, each product-device having tens and units complementary shoulders, the effective multiplier-device being actuable by the general operator twice for each complete multiplying operation by a single digit, of a carriage to support said multiplier-devices, means actuable to reciprocate said carriage to position the multiplier-devices so that each device will be operable to first actuate the tens shoulders and then the units shoulders of the product-devices, settable multiplicand-devices actuable by said product devices, a carriage having register dial-wheels and racks to drive said dial-wheels, said racks to be intermittently driven by adjoining multiplicand-devices, means to shift said register-carriage after each partial multiplying operation by a single digit, a gear driven by said general operator, and means rendered operable by said key-connections with said gear to reciprocate the multiplier-carriage and feed the registering dial-carriage.

89. In a multiplying machine, the combination with a register-carriage having dial-wheels and racks on said carriage to rotate said dial-wheels, multplier-devices, a general operator to actuate the multiplier-devices, product-devices to be driven by the multiplier-devices, non-traveling multiplicand-devices to be engaged by the product-devices to drive said racks, said product-devices having tens and units complementary elements to be engaged by the multiplier-devices, a carriage to support said multiplier-devices and a gear driven by said general operator, of means connectible with said gear to shift the registering carriage and carry the dial-racks into co-operative relation with the multiplicand-devices of next higher denominational order, and key-controlled means operable by said gear to reciprocate the multiplier-carriage and alternately bring each multiplier-device into co-operative relation with predetermined tens and units elements of the product-devices.

90. In a multiplying machine, the combination with multiplicand-slides having indexing devices thereon from 1 to 9, of a carriage including denominational racks connected with said slides and dial-wheels to be driven by said racks, a general operator, a series of normally-ineffective multiplier-elements from 1 to 9, means to render effective any one of said multiplier-elements to be driven by the general operator, and a series of intermediate product elements movable with any general operator-driven multiplier-element, said product-elements selectively engagaing said indexing devices to actuate the multiplicand slides and rotate the dial-wheels.

91. In a multiplying machine, the combination with multiplicand-slides, a group of numeral-keys, indexing devices from 1 to 9 on each slide settable by said numeral-keys, a carriage, carriage-feeding mechanism operable by said keys, and denomination-selecting mechanism for said multiplicand-slides operable by said carriage, of a register-carriage having racks connected with said slides, a dial-wheel to be driven by each rack, a general operator, a series of multiplier-elements normally ineffective, a group of multiplier-keys, each multiplier-key operative to render a multiplier-element effective when actuated by the general operator, and a series of intermediate product-elements engageable by the general operator driven multiplier-element, said product-elements engaging the indexed devices to actuate the multiplicand-slides to rotate the dial-wheels.

92. In a multiplying machine, the combination of multiplicand-slides, indexing devices on said slides from 1 to 9, a rack connected with each slide, a dial-wheel to be driven by each rack, a general operator having two consecutive cycles of movement, a series of normally-ineffective multiplier driving elements, means to render effective any one of said driving elements, so that the effective driving element may be consecutively actuated by both cycles of the general operator, a series of intermediate product-elements to be actuated by the effective multiplier-element, said product-elements engaging the indexed devices to actuate the multiplicand-slides during each cycle of the general operator, and independent means operable by the general operator to restore the multiplicand indexed devices.

93. In a multiplying machine, the combination with multiplicand-slides having indexing devices thereon from 1 to 9, of a carriage having racks connected with said slides, and a register having dial-wheels, each dial-wheel connected to a rack, a general operator, a series of normally-ineffective multiplier-elements, means to select and render effective any one of said multiplier-elements, so that each selected multiplier-element may be actuated by the general operator, a series of intermediate product-elements having means to be actuated by the general operator driven multiplier-element, said product-elements also having means to engage the indexed devices of the multiplicand-slides, and means actuable by the general operator to shift the dial-racks relative to the multiplicand-slides.

94. In a computing machine, the combination with a multiplying mechanism including denominationally-arranged power-driven multiplicand-driving devices, key-operated indexing means therefor, and a register including dial-wheels and rack-bars for rotating said dial-wheels, of a carriage slidable relatively to said driving devices, and carrying said dial-wheels and said rack-bars, said rack-bars to be driven by said driving devices to rotate said dial-wheels, each rack bar being operable by any of said driving devices, and means to shift said carriage with said rack-bars laterally one step for each complete multiplying operation of a single digit, to present rack-bars to the driving devices seriatim, to change the denominational relation between the series of rack-bars and said series of driving devices, so that each multiplicand-device may engage the rack-bar of next lower denominational order.

95. In a computing machine, the combination of numeral-key levers, a general operator, multiplier-devices to be actuated by the general operator, but normally out of effective relation therewith, there being one multiplier-device associated with each key-lever, a connection between each key-lever and the corresponding multiplier-device whereby said device may be moved into the path of the general operator, a bail to detain the actuated key-lever in its actuated position throughout the cycling action of the general operator, a normally ineffective releaser, means actuable by any key-lever to connect said releaser with the general operator to move therewith, and a lever actuable by said releaser and effective to vibrate the bail and release the operated multiplier-key lever.

96. In a computing machine, the combination with multiplying mechanism including an array of denominationally-arranged stationary multiplicand-devices, indexing means therefor including multiplicand-keys, multiplier-keys, and a general operator to actuate said multiplicand-devices twice for each multiplying operation, of a carriage having registering dial-wheels, said carriage also having rack-bars to drive said dial-wheels, said rack-bars being presented to said multiplicand-devices successively to be driven thereby to rotate said dial-wheels in successive denominations, and feeding mechanism controllable by any multiplier-key to feed the register-and-rack carriage to change the denominational relation between the rack-bars and said multiplicand-devices, so that each multiplicand-device will automatically engage the dial-driving rack-bars of next lower denominational order at the beginning of each second actuation of the general operator for a multiplying operation, said feeding mechanism including means automatically connectible with the general operator to drive said register-carriage.

97. In a multiplying mechanism, a slidable frame and a series of index-pins individually slidable transversely through the frame, each pin having a lip projecting from the side thereof and settable to be engaged by a frame sliding means.

98. In a multiplying mechanism, a slidable frame and a series of index-pins individually slidable across one side of the frame, each pin having a lip projecting from the side of the pin to project through and beyond the opposite side of the frame, said pin being settable to position the lip to be engaged by a frame-sliding means.

99. In a multiplying mechanism, a slidable frame and a series of index-pins individually slidable transversely through the frame, each pin having a lip projecting from the side thereof to pass through a clearance-hole in the frame to project beyond the frame and settable in position to be engaged by a frame-sliding means.

100. In a multiplying mechanism, a slidable frame and a series of index-pins individually slidable transversely through the frame, each pin having a lip projecting from the side thereof to pass through a clearance-hole in the frame to project beyond the frame and settable in position to be engaged by a frame-sliding means, each clearance-hole operating to arrest the lip and limit the sliding movement of its pin.

101. In a multiplying mechanism, the combination of a single set of key-indexing devices from "1" to "9", product-plates co-operating directly with set indexing devices, and means for actuating said product-plates and the set indexed devices twice in succession in accordance with the digital value of the product of the multiplicand and the multiplier.

102. In a multiplying machine having a carriage including dials and dial-driving members in many denominations, the combination of multiplicand-slides having indexing elements for values from 1 to 9, key-operated means to selectively set the indexing elements, a series of nine product-devices, and a series of nine multiplier-devices, said product-devices being collectively driven by each multiplier-device, said product-devices having elements of successive denominations automatically operative in determining the extent of movement of said multiplicand-slides in successive operations of the slides by the same multiplier-device.

103. In a multiplying machine having a carriage including dials and dial-driving members in many denominations, the combination of multiplicand-slides having indexing elements for values from 1 to 9, key-operated means to selectively set the indexing elements, a series of nine product-devices, and a series of nine multiplier-devices, said product-devices being collectively driven by each multiplier-device, said product-devices having elements of successive denominations automatically operative in determining the extent of movement of said multiplicand-slides in successive operations of the slides by the same multiplier-device, each product-device being a plate formed with individual means engageable with the set-up indexing elements of a multiplicand-slide.

104. In a multiplying machine having a carriage including dials and dial-driving members in many denominations, the combination of multiplicand-slides having indexing elements for values from 1 to 9, key-operated means to selectively set the indexing elements, a series of nine multiplier-devices, and a series of nine product-elements, each product-element including devices engageable with an indexed element of any multiplicand-slide and units and tens devices engageable by any multiplier-device to determine the extent of movement for each multiplicand-slide to drive the dial-driving members of the carriage.

105. In a multiplying machine having a carriage, including dials, and dial-driving members, the combination of a series of multiplicand-slides, each slide having nine indexing elements for values from 1 to 9, a single set of keys, from 1 to 9, operative selectively to set said indexing elements, a set of product-devices, a series of multiplier-elements, each product-device engageable by a multiplier-element to engage the key-set indexed elements of the multiplicand-slides, a general operator, and key-actuated means operable to present a multiplier-element to be driven by the general operator to drive the product-devices, to drive the indexed elements of the multiplicand-slides, to drive the dial-driving members of the carriage.

106. In a multiplying machine having a carriage, including dials, and dial-driving members, the combination of a series of multiplicand-slides, a set of nine indexing elements associated with each multiplicand-slide, each set having values from 1 to 9, key-controlled means to selectively set said indexing elements, a series of product-plates to engage the set indexed elements, and a series of key-controlled multiplier-elements, each product-plate having portions engageable by a multiplier-element and also having portions to engage the set indexed elements of the multiplicand-slides to drive the dial-driving members of the carriage.

107. In a multiplying machine, the combination of a product-register, multiplicand-devices for actuating said register, product-devices for actuating said multiplicand-devices, a multiplier-device for actuating said product-devices, each product-device including a rectangular plate having multiplicand-operating means at one end and product-means at the opposite end thereof engageable with a multiplier-device, a general operator, and means operable by the general operator to bring the multiplier-device into successive co-operation with said product-means to promote a tens and units articulation of the multiplicand-devices.

HANS HANSON.